United States Patent
Kawate et al.

(10) Patent No.: US 7,819,718 B2
(45) Date of Patent: Oct. 26, 2010

(54) ELECTRONIC DEVICE HAVING CATALYST USED TO FORM CARBON FIBER ACCORDING TO RAMAN SPECTRUM CHARACTERISTICS

(75) Inventors: Shinichi Kawate, Kanagawa (JP); Takeo Tsukamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1253 days.

(21) Appl. No.: 11/299,725

(22) Filed: Dec. 13, 2005

(65) Prior Publication Data
US 2008/0106181 A1    May 8, 2008

Related U.S. Application Data

(62) Division of application No. 10/106,484, filed on Mar. 27, 2002, now Pat. No. 7,074,105.

(30) Foreign Application Priority Data

| Mar. 27, 2001 | (JP) | ............................... 2001-089384 |
| Sep. 10, 2001 | (JP) | ............................... 2001-273944 |
| Jan. 24, 2002 | (JP) | ............................... 2002-015000 |
| Mar. 22, 2002 | (JP) | ............................... 2002-080078 |

(51) Int. Cl.
*H01J 9/04* (2006.01)
*H01J 9/12* (2006.01)
*H01J 31/48* (2006.01)

(52) U.S. Cl. .......................... 445/51; 977/724; 977/749; 313/311

(58) Field of Classification Search ................ 313/495, 313/309–311, 346 R; 445/51; 427/77, 78; 257/24; 977/724, 749
See application file for complete search history.

(56) References Cited

U.S. PATENT DOCUMENTS 4,728,851 A    3/1988    Lambe ........................ 313/309

(Continued)

FOREIGN PATENT DOCUMENTS

CN    1181607 A    5/1998

(Continued)

OTHER PUBLICATIONS

Lu, W.C., et al. "Novel Multimetallic Hydroisomerization Catalysts", Journal of Catalysis, vol. 146 No. 2, pp. 608-612 (1994).

(Continued)

*Primary Examiner*—Nimeshkumar D. Patel
*Assistant Examiner*—Peter Macchiarolo
(74) *Attorney, Agent, or Firm*—Fitzpatrick, Cella, Harper & Scinto

(57) ABSTRACT

A method of making an electron-emitting device has the steps of disposing a film containing metal on a substrate, arranging a plurality of catalytic particles on the film containing metal, and heat-treating the substrate on which the plurality of catalytic particles are arranged under circumstance including hydrocarbon gas and hydrogen to form a plurality of carbon fibers. Catalytic particles contain Pd and at least one element selected from the group consisting of Fe, Co, Ni, Y, Rh, Pt, La, Ce, Pr, Nd, Gd, Tb, Dy, Ho, Er and Lu, and 20~80 atm % (atomic percentage) or more of the at least one element is contained in the catalytic particles relative to Pd.

32 Claims, 15 Drawing Sheets

U.S. PATENT DOCUMENTS

| | | | |
|---|---|---|---|
| 4,816,289 A | 3/1989 | Komatsu et al. | 423/447.3 |
| 4,900,483 A | 2/1990 | Witzke et al. | 264/29.2 |
| 4,904,895 A | 2/1990 | Tsukamoto et al. | 313/336 |
| 4,956,578 A | 9/1990 | Shimizu et al. | 315/3 |
| 5,066,883 A | 11/1991 | Yoshioka et al. | 313/309 |
| 5,185,554 A | 2/1993 | Nomura et al. | 313/495 |
| 5,192,240 A | 3/1993 | Komatsu | 445/24 |
| 5,214,346 A | 5/1993 | Komatsu | 313/309 |
| 5,382,867 A | 1/1995 | Yuji et al. | 313/309 |
| 5,443,859 A | 8/1995 | Nagata | 427/122 |
| 5,458,784 A | 10/1995 | Baker et al. | 210/674 |
| 5,500,200 A | 3/1996 | Mandeville et al. | 423/447.3 |
| 5,543,684 A | 8/1996 | Kumar et al. | 313/309 |
| 5,551,903 A | 9/1996 | Kumar et al. | 445/24 |
| 5,577,943 A | 11/1996 | Vickers et al. | 445/24 |
| 5,612,587 A | 3/1997 | Itoh et al. | 313/309 |
| 5,618,875 A | 4/1997 | Baker et al. | 524/495 |
| 5,690,997 A | 11/1997 | Grow | 427/249.1 |
| 5,726,524 A | 3/1998 | Debe | 313/309 |
| 5,770,918 A | 6/1998 | Kawate et al. | 313/495 |
| 5,773,921 A | 6/1998 | Keesmann et al. | 313/309 |
| 5,847,495 A | 12/1998 | Yamanobe et al. | 313/310 |
| 5,861,227 A | 1/1999 | Ikeda et al. | 430/31 |
| 5,869,922 A | 2/1999 | Tolt | 313/310 |
| 5,872,422 A | 2/1999 | Xu et al. | 313/311 |
| 5,872,541 A | 2/1999 | Yoshioka et al. | 345/74.1 |
| 5,935,639 A | 8/1999 | Sullivan et al. | 427/78 |
| 5,965,267 A | 10/1999 | Nolan et al. | 428/408 |
| 5,973,444 A | 10/1999 | Xu et al. | 313/309 |
| 5,981,305 A | 11/1999 | Hattori | 438/20 |
| 5,982,091 A | 11/1999 | Konishi | 313/495 |
| 5,986,389 A | 11/1999 | Tsukamoto | 313/310 |
| 6,087,765 A | 7/2000 | Coll et al. | 313/309 |
| 6,129,602 A | 10/2000 | Yamanobe | 445/24 |
| 6,135,839 A | 10/2000 | Iwase et al. | 445/24 |
| 6,147,449 A | 11/2000 | Iwasaki et al. | 313/495 |
| 6,171,162 B1 | 1/2001 | Iwasaki et al. | 445/6 |
| 6,184,610 B1 | 2/2001 | Shibata et al. | 313/309 |
| 6,204,597 B1 | 3/2001 | Xie et al. | 313/310 |
| 6,228,904 B1 | 5/2001 | Radev et al. | 313/309 |
| 6,231,413 B1 | 5/2001 | Tsukamoto | 445/24 |
| 6,246,168 B1 | 6/2001 | Kishi et al. | 313/495 |
| 6,283,812 B1 | 9/2001 | Jin et al. | 445/24 |
| 6,283,815 B1 | 9/2001 | Iwasaki et al. | 445/41 |
| 6,288,494 B1 | 9/2001 | Tsukamoto et al. | 315/169.1 |
| 6,290,564 B1 | 9/2001 | Talin et al. | 445/50 |
| 6,313,572 B1 | 11/2001 | Yamada | 313/310 |
| 6,331,690 B1 | 12/2001 | Yudasaka et al. | 219/121.6 |
| 6,333,016 B1 | 12/2001 | Resasco et al. | 423/447.3 |
| 6,390,612 B1 | 5/2002 | Kotaki et al. | 347/85 |
| 6,400,091 B1 | 6/2002 | Deguchi et al. | 315/169.1 |
| 6,413,487 B1 | 7/2002 | Resasco et al. | 423/447.3 |
| 6,435,928 B1 | 8/2002 | Tsukamoto | 445/24 |
| 6,445,006 B1 | 9/2002 | Brandes et al. | 257/76 |
| 6,448,709 B1 | 9/2002 | Chuang et al. | 313/497 |
| 6,455,021 B1 | 9/2002 | Saito | 423/447.3 |
| 6,471,936 B1 | 10/2002 | Chen et al. | 423/658.2 |
| 6,472,814 B1 | 10/2002 | Yamanobe et al. | 313/495 |
| 6,512,329 B1 | 1/2003 | Mitsutake et al. | 313/495 |
| 6,517,399 B1 | 2/2003 | Ito et al. | 445/24 |
| 6,624,589 B2 | 9/2003 | Kitamura et al. | 315/169.3 |
| 6,626,719 B2 | 9/2003 | Ono et al. | 445/24 |
| 6,628,053 B1 | 9/2003 | Den et al. | 313/310 |
| 6,848,962 B2 | 2/2005 | Kitamura et al. | 445/24 |
| 6,853,126 B2 | 2/2005 | Nomura | 313/492 |
| 6,858,990 B2 | 2/2005 | Tsukamoto | 315/169.1 |
| 6,948,995 B2 | 9/2005 | Ishikura et al. | 445/51 |
| 2001/0006232 A1 | 7/2001 | Choi et al. | 257/10 |
| 2002/0009637 A1 | 1/2002 | Murakami et al. | 429/213 |
| 2002/0031465 A1 | 3/2002 | Saito | 423/445 B |
| 2002/0031972 A1 | 3/2002 | Kitamura et al. | 445/3 |
| 2002/0047562 A1 | 4/2002 | Kitamura et al. | 315/169.3 |
| 2002/0057045 A1 | 5/2002 | Tsukamoto | 313/309 |
| 2002/0060516 A1 | 5/2002 | Kawate et al. | 313/495 |
| 2002/0074947 A1 | 6/2002 | Tsukamoto | 313/169.3 |
| 2002/0136896 A1 | 9/2002 | Takikawa et al. | 428/408 |
| 2002/0146958 A1 | 10/2002 | Ono et al. | 445/24 |
| 2003/0048055 A1 | 3/2003 | Ishikura et al. | 313/311 |
| 2003/0048056 A1 | 3/2003 | Kitamura et al. | 313/311 |
| 2003/0048057 A1 | 3/2003 | Oyama et al. | 313/311 |
| 2003/0057860 A1 | 3/2003 | Tsukamoto | 315/169.3 |
| 2003/0222560 A1 | 12/2003 | Roach | 313/311 |
| 2004/0063839 A1 | 4/2004 | Kawate et al. | 524/439 |

FOREIGN PATENT DOCUMENTS

| | | |
|---|---|---|
| EP | 0 290 026 A1 | 11/1988 |
| EP | 2-112125 | 4/1990 |
| EP | 0 394 698 A2 | 10/1990 |
| EP | 0 433 507 A1 | 6/1991 |
| EP | 0 443 865 A1 | 8/1991 |
| EP | 0 290 026 B1 | 2/1993 |
| EP | 0 535 953 A2 | 4/1993 |
| EP | 0 614 209 A1 | 9/1994 |
| EP | 0 535 953 B1 | 1/1996 |
| EP | 0 716 439 | 6/1996 |
| EP | 0 758 028 A2 | 2/1997 |
| EP | 0 797 233 A2 | 9/1997 |
| EP | 0 836 217 A1 | 4/1998 |
| EP | 0 871 195 A1 | 10/1998 |
| EP | 0 913 508 A2 | 5/1999 |
| EP | 0 913 508 A3 | 5/1999 |
| EP | 0 936 650 A1 | 8/1999 |
| EP | 0 980 089 A1 | 2/2000 |
| EP | 0 451 208 B1 | 3/2000 |
| EP | 0 986 084 A2 | 3/2000 |
| EP | 1 022 763 A1 | 7/2000 |
| EP | 1 113 478 A1 | 4/2001 |
| EP | 1 096 533 A1 | 5/2001 |
| EP | 1 102 299 A1 | 5/2001 |
| EP | 0 117 118 A1 | 7/2001 |
| EP | 1 120 877 A1 | 8/2001 |
| EP | 1 122344 A2 | 8/2001 |
| EP | 1 187 161 A2 | 3/2002 |
| EP | 0 758 028 B1 | 9/2002 |
| GB | 2 308 495 A | 6/1997 |
| JP | 1-309242 | 12/1989 |
| JP | 3-20941 | 1/1991 |
| JP | 3-260119 | 11/1991 |
| JP | 3-295131 | 12/1991 |
| JP | 4-212236 | 8/1992 |
| JP | 5-159696 | 6/1993 |
| JP | 5-198253 | 8/1993 |
| JP | 5-211029 | 8/1993 |
| JP | 5-274997 | 10/1993 |
| JP | 7-6714 | 1/1995 |
| JP | 08-115652 | 5/1996 |
| JP | 8-115652 | 5/1996 |
| JP | 8-264109 | 10/1996 |
| JP | 08-298068 | 11/1996 |
| JP | 9-82214 | 3/1997 |
| JP | 9-188600 | 7/1997 |
| JP | 10-149760 | 6/1998 |
| JP | 10-289650 | 10/1998 |
| JP | 11-139815 | 5/1999 |
| JP | 11-162334 | 6/1999 |
| JP | 11-167859 | 6/1999 |
| JP | 11-194134 | 7/1999 |
| JP | 11-232997 | 8/1999 |
| JP | 2000-57934 | 2/2000 |
| JP | 2000-86216 | 3/2000 |
| JP | 2000-90809 | 3/2000 |
| JP | 2000-95509 | 4/2000 |
| JP | 2000-095509 | 4/2000 |

| | | |
|---|---|---|
| JP | 2000-208028 | 7/2000 |
| JP | 2000-223005 | 8/2000 |
| JP | 2000/277003 | 10/2000 |
| JP | 2001-35350 | 2/2001 |
| JP | 2001-52598 | 2/2001 |
| JP | 2001-162600 | 6/2001 |
| JP | 2001-288625 A | 10/2001 |
| WO | 89/07163 | 8/1989 |
| WO | WO 90/07023 | 6/1990 |
| WO | WO 98/05920 | 2/1998 |
| WO | WO 99/09576 | 2/1999 |
| WO | WO 99/58748 | 11/1999 |
| WO | WO 01/26130 A1 | 4/2001 |
| WO | WO 01/93292 A1 | 12/2001 |

OTHER PUBLICATIONS

A.M. Rao, et al., *In Situ-grown Carbon nanotube Array with Excellent Field Emission Characteristics*, Applied Physics Letters, vol. 76, No. 25, (2000). pp. 3813-3815.

Cheol Jin Lee, et al., *Carbon Nanofibers Grown on Sodalime Glass at 500° C. Using Thermal Chemical Vapor Deposition*, Chemical Physics Letters 340 (2001), pp. 413-418.

Sashiro Uemura et al., *Carbon-Nanotube FED with Graphite-Nano-Fiber Emitters*, ISSN 1083-1312, pp. 398-401.

Q.H. Wang et al., *A Nanotube-based Field-emission Flat Panel Display*, Applied Physics Letters, vol. 72, No. 22, Jun. 1998, pp. 2912-2913.

Cheol Jin Lee et al, *Carbon Nanofibers Grown on Sodalime Glass at 500° C. Using Thermal Chemical Vapor Deposition*, Chemical Physics Letters 340 (2001) pp. 413-418.

C.A. Spindt et al, *Physical Properties of Thin-Film Field Emission Cathodes with Molybdenum Cones*, Journal of Applied Physics, vol. 47, No. 12, Dec. 1976, pp. 5248-5263.

R.T.K. Baker et al., "Formation of Carbonaceous Deposits from the Platinum-Iron Catalyzed Decomposition of Acetylene", 37 J. Catal. pp. 101-105 (1975).

R.T.K. Baker, "Catalytic Growth of Carbon Filaments", 27 (3) Carbon pp. 315-323 (1989).

S. Iijima, "Helical Microtubules of Graphite Carbon," Nature, vol. 345, pp. 56-58 (1991).

T.W. Ebbesen et al., "Large-Scale Synthesis of Carbon Nanotubes," Nature, vol. 358, pp. 220-222 (1992).

W.A. de Heer et al., "Aligned Carbon Nanotube Films: Production and Optical and Electronic Properties", Science vol. 268, pp. 845-847 (1995).

T. Guo et al., "Catalytic Growth of Single-Walled Nanotubes by Laser Vaporization", Chem. Phys. Letters, vol. 243, pp. 49-54 (1995).

A.G. Rinzler et al., "Unraveling Nanotubes: Field Emission from an Atomic Wire", Science, vol. 269, pp. 1550-1553 (1995).

W.A. de Heer et al., "A Carbon Nanotube Field-Emission Electron Source," Science, vol. 270, pp. 1179-1180 (1995).

T. Kyotani et al., "Preparation of Ultrafine Carbon Tubes in Nanochannels of an Anodic Aluminum Oxide Film", Chem. Mater., vol. 8, pp. 2109-2113 (1996).

A. Thess et al., "Crystalline Ropes of Metallic Carbon Nanotubes", Science, vol. 273, pp. 483-487 (1996).

H. Dai et al., "Single-Wall Nanotubes Produced by Metal-Catalyzed Disproportionation of Carbon Monoxide", Chemical Physics Letters, vol. 260, pp. 471-475 (1996).

H. Dai et al., "Nanotubes as Nanoprobes in Scanning Probe Microscopy", Nature, vol. 384, pp. 147-150 (1996).

A.C. Dillon et al., "Storage of Hydrogen in Single-Walled Carbon Nanotubes", Nature, vol. 386, pp. 377-379 (1997).

W.P. Dyke et al., "Field Emission", Advances in Electronics and Electron Physics, vol. 8, pp. 89-185 (1956).

C.A. Mead, "Operation of Tunnel-Emission Devices", Journal of Applied Physics, vol. 32, No. 4, pp. 646-652 (1961).

Toshiaki Kusunoki et al., "Fluctuation-Free Electron Emission from Non-Formed Metal-Insulator-Metal (MIM) Cathodes Fabricated by Low Current Anodic Oxidation", Japanese Journal of Applied Physics, vol. 32, No. 11B, pp. L1695-1697.

M.I. Elinson et al., "The Emission of Hot Electrons and the Field Emission of Electrons from Tin Oxide", Radio Engineering and Electronic Physics, pp. 1290-1296 (1965).

G. Dittmer, "Electrical Conduction and Electron Emission of Discontinuous Thin Films", Thin Solid Films, vol. 9, pp. 317-329 (1972).

M. Hartwell et al., "Strong Electron Emission from Patterned Tin-Indium Oxide Thin Films", IEDM Technical Digest, Int'l. Electron Devices Meeting, Washington, D.C., pp. 519-521 (1975).

Hisashi Araki et al., Electroforming and Electron Emission of Carbon Thin Films, Journal of the Vacuum Society of Japan, (with English Abstract on p. 22) (1983).

Rodriguez et al., "Catalytic Engineering of Carbon Nanostructures", Langmuir 11, pp. 3862-3866 (1995).

Patent Abstracts of Japan, Publication No. 08115652, vol. 1996, No. 09, May 7, 1996.

W. Zhu et al., *Electron Field Emission From Nanostructured Diamond and Carbon Nanotubes*, Solid State Electronics, vol. 45, 2001, pp. 921-928.

J.M. Bonard et al., *Field Emission From Carbon Nanotubes: The First Five Years*, Solid State Electronics, vol. 45, 2001, pp. 893-914.

2B—2B SECTION

FIG. 16A
FIG. 16B
FIG. 16C
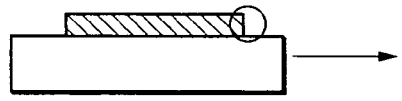
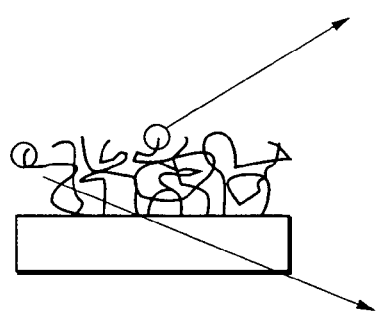
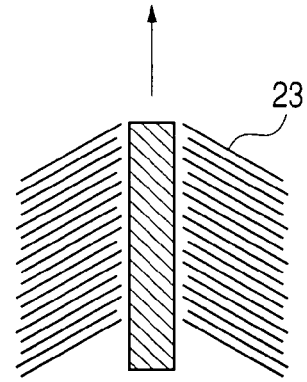
AXIAL DIRECTION
OF FIBER
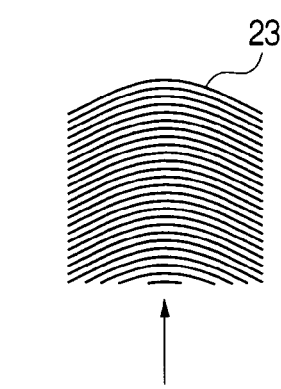
AXIAL DIRECTION
OF FIBER

ELECTRONIC DEVICE HAVING CATALYST USED TO FORM CARBON FIBER ACCORDING TO RAMAN SPECTRUM CHARACTERISTICS

CROSS REFERENCE TO RELATED APPLICATION

This application is a division of U.S. application Ser. No. 10/106,484, filed Mar. 27, 2002 now U.S. Pat. No. 7,074,105.

BACKGROUND OF THE INVENTION

1. Field of the Invention

The present invention relates to catalytic material for promoting growth of carbon and its preparing method, and electron emitting device, electron source, image forming apparatus, secondary battery and body for storing hydrogen using a carbon fiber formed by the catalytic material. The image forming apparatus of the present invention can be used as an image forming apparatus for an optical printer having a photosensitive drum as well as a display device for television broadcasting, an image display device of television conference system or computer and so on.

2. Related Background Art

A method of making carbon fibril is disclosed in Japanese Patent Laid-Open Gazette No. 4-504445 (corresponding family patents WO9007023 and EP0451208). Further, a method of preparing filamentary carbon is disclosed in Japanese Patent Laid-Open No. 3-260119 (corresponding family patents U.S. Pat. No. 4,900,483 and EP433507).

Further, a method of preparing carbon nanotube is disclosed in Japan Patent Laid-Open No. 2000-95509.

An electron emitting element using carbon fiber is disclosed in U.S. Pat. No. 4,728,851 publication, U.S. Pat. No. 5,872,422 specification, U.S. Pat. No. 5,726,524 specification, Japanese Patent Laid-Open No. 8-115652, Japanese Patent Laid-Open No. 2000-057934, Japanese Patent Laid-Open No. 2000-208028, Japanese Patent Laid-Open No. 2001-052598, "Carbon Nanotube FED with Graphite Nano-Fiber Emitters" SID2000, pp 398-401, "A nanotube-based field emission flat panel display" Applied Physics Letters, vol. 72, No. 22, pp 2912-2913 (1998) and so on.

And, results of Raman spectrum analysis of carbon fiber is disclosed in Chemical Physics Letters 340 (2001), pp 413-418, as an example, as shown in FIGS. 13A and 13B.

SUMMARY OF THE INVENTION

Generally in a conventional method of forming carbon fiber such as carbon nanotube upon a substrate by using catalytic metal with the Plasma CVD manner, temperature of the substrate should be raised to 800 to 900° C., which may give an adverse effect on other members or increase costs.

An object of the present invention is to provide a catalyst, which enables to form carbon fiber satisfactorily at low temperature without needing complex process, and its preparing method.

In addition, compared with so-called Spindt-type electron emitting element disclosed in such as C. A. Spindt, "Physical properties of thin-film field emission cathodes with molybdenum cones", J. Applied. Physics, 47.5248 (1976), the electron emission element using the carbon fiber shows advantages of low electric field needed for electron emitting, low vacuum level needed for driving and furthermore high emitted electron density.

However, in case of using the electron emitting element using carbon fiber as an electron source of a flat panel display, such characteristics should be maintained for a long time.

For example, if the emitting current density of the electron emitting element is greatly lowered in case of being applied to an image display device, this may cause serious deterioration of quality of display images. For that reason, improving the characteristics further is one of essential problems in the electron emitting element using carbon fiber.

The present invention is related to such problems, and another object is to obtain electron emitting element, electron source and image forming apparatus using carbon fiber, which may maintain advantages of low electric field needed for electron emitting, low vacuum level needed for driving and furthermore high emitted current density for a long time.

As a result of comprehensive investigation for accomplish the above object, the inventors have found that it is very preferable to use catalytic particles, which containing Pd and specific additives, as a catalyst used to form carbon fiber and then completed this invention.

According to one aspect of the present invention, there is provided an electron emitting device comprising a film containing a plurality of carbon fibers, wherein the film, according to Raman spectrum characteristic detected by irradiating laser having a wavelength of 514.5 nm, has a first peak of intensity of Raman dispersion light in which Raman shift is in a range of 1355±10 kaiser ($cm^{-1}$) and a second peak of intensity of Raman scattering in which Raman shift is in a range of 1580±10 kaiser, and wherein a Full-Width Half-Maximum (FWHM2) of the first peak and a Full-Width Half-Maximum (FWHM1) of the second peak satisfy a relation that FWHM2/FWHM1$\leq$1.2.

According to another aspect of the present invention, there is provided an electron emitting device comprising a film containing a plurality of carbon fibers, wherein the film, according to Raman spectrum characteristic detected by irradiating laser having a wavelength of 514.5 nm, has a first peak of intensity of Raman scattering in which Raman shift is in a range of 1355±10 kaiser ($cm^{-1}$) and a second peak of intensity of Raman scattering in which Raman shift is in a range of 1580±10 kaiser, and wherein a relative intensity h2, which is difference between background intensity and intensity of the Raman scattering at the first peak, and a relative intensity h1, which is difference between background intensity and intensity of the Raman scattering at the second peak, satisfy a relation that 1.3$\leq$h2/h1.

According to further aspect of the present invention, there is provided an electron emitting device comprising a film containing a plurality of carbon fibers, wherein the film, according to Raman spectrum characteristic detected by irradiating laser having a wavelength of 514.5 nm, has a first peak of intensity of Raman scattering in which Raman shift is in a range of 1355±10 kaiser ($cm^{-1}$) and a second peak of intensity of Raman scattering in which Raman shift is in a range of 1580±10 kaiser, wherein a Full-Width Half-Maximum (FWHM2) of the first peak and a Full-Width Half-Maximum (FWHM1) of the second peak satisfy a relation that FWHM2/FWHM1$\leq$1.2, and wherein a relative intensity h2, which is difference between background intensity and intensity of the Raman scattering at the first peak, and a relative intensity h1, which is difference between background intensity and intensity of the Raman scattering at the second peak, satisfy a relation that 1.3$\leq$h2/h1.

According to still another aspect of the present invention, there is provided features an electron emitting device comprising a film containing a plurality of carbon fibers, wherein the carbon fiber is graphite nanofiber having graphenes laminated not in parallel to the axial direction thereof, and wherein the plurality of carbon fibers included in the film containing a plurality of carbon fibers have density over $10^3/cm^2$.

According to still another aspect of the present invention, there is provided an image display device comprising a first substrate on which an electron emitting device having a film containing a plurality of carbon fibers is arranged, and a second substrate having a light emitting member and an anode electrode and arranged in opposition to the first substrate, wherein the carbon fiber is graphite nanofiber having graphene laminated not in parallel to the axial direction thereof, wherein the number of electron emission sites of the film containing a plurality of carbon fibers is more than $10^3/$cm when electrons are emitted from the film containing a plurality of carbon fibers by electric field intensity more than $1 \times 10^5$ V/cm is applied between the film containing a plurality of carbon fiber and the anode electrode.

According to still another aspect of the present invention, there is provided a catalyst used to form carbon fiber, which comprises Pd and at least one element selected from the group consisting of Fe, Co, Ni, Y, Rh, Pt, La, Ce, Pr, Nd, Gd, Th, Dy, Ho, Er and Lu, wherein 20 atm % or more (atomic percentage) of the selected at least one element is contained to Pd (i.e., is contained in the catalyst (particles) relative to Pd).

According to still further aspect of the present invention there is provided a catalyst used to form carbon fiber comprises Pd and at least one element selected from the group consisting of Fe, Co and Ni, 20 atm % or more (atomic percentage) of the selected at least one element is contained to Pd.

According to still another aspect of the present invention there is provided a method of making a film containing a plurality of carbon fibers comprising the steps of: arranging a catalyst on a substrate; and heat-treating the substrate on which the catalyst are arranged under circumstance including hydrocarbon gas and hydrogen, wherein the catalyst contains Pd and at least one element selected from the group consisting of Fe, Co, Ni, Y, Rh, Pt, La, Ce, Pr, Nd, Gd, Th, Dy, Ho, Er and Lu, and 20 atm % or more (atomic percentage) of the selected at least one element is contained to Pd.

According to still another aspect of the present invention there is provided a method of making a film containing a plurality of carbon fibers comprising the steps of: arranging a plurality of catalytic particles on a substrate; and heat-treating the substrate on which the plurality of catalytic particles are arranged under circumstance including hydrocarbon gas and hydrogen, wherein the catalyst contains Pd and at least one element selected from the group consisting of Fe, Co, Ni, Y, Rh, Pt, La, Ce, Pr, Nd, Gd, Th, Dy, Ho, Er and Lu, and more than 20 atm % (atomic percentage) of the selected at least one element is contained to Pd.

According to still another aspect of the present invention, there is provided a method of making an electron emitting device comprising the steps of: disposing a film containing metal on a substrate; arranging a plurality of catalytic particles on the film containing metal; and heat-treating the substrate on which the plurality of catalytic particles are arranged under circumstance including hydrocarbon gas and hydrogen to form a plurality of carbon fibers, wherein the catalystic particles contains Pd and at least one element selected from the group consisting of Fe, Co, Ni, Y, Rh, Pt, La, Ce, Pr, Nd, Gd, Th, Dy, Ho, Er and Lu, and 20 atm % or more (atomic percentage) of the selected at least one element is contained to Pd.

According to still another aspect of the present invention, there is provided a method of making an electron emitting device comprising the steps of: disposing a film containing metal on a substrate; arranging a plurality of catalytic particles on the substrate containing metal; and heat-treating the substrate on which the plurality of catalytic particles are arranged under circumstance including hydrocarbon gas and hydrogen to form a plurality of carbon fibers, wherein the catalytic particles contains Pd and at least one element selected from the group consisting of Fe, Co and Ni, and more than 20 atm % (atomic percentage) of the selected at least one element is contained to Pd.

According to still another aspect of the present invention, there is provided a cathode of a secondary battery containing a plurality of carbon fibers, wherein a film containing a plurality of the carbon fibers, according to Raman spectrum characteristic detected by irradiating laser having a wavelength of 514.5 nm, has a first peak of intensity of Raman scattering in which Raman shift is in a range of 1355±10 kaiser ($cm^{-1}$) and a second peak of intensity of Raman scattering in which Raman shift is in a range of 1580±10 kaiser, and wherein a Full-Width Half-Maximum (FWHM2) of the first peak and a Full-Width Half-Maximum (FWHM1) of the second peak satisfy a relation that FWHM2/FWHM1≦1.2.

According to still another aspect of the present invention, there is provided a cathode of a secondary battery containing a plurality of carbon fibers, wherein a film containing a plurality of the carbon fibers, according to Raman spectrum characteristic detected by irradiating laser having a wavelength of 514.5 nm, has a first peak of intensity of Raman scattering in which Raman shift is in a range of 1355±10 kaiser ($cm^{-1}$) and a second peak of intensity of Raman scattering in which Raman shift is in a range of 1580±10 kaiser, and wherein a relative intensity h2, which is difference between background intensity and intensity of the Raman scattering at the first peak, and a relative intensity h1, which is difference between background intensity and intensity of the Raman scattering at the second peak, satisfy a relation that 1.3≦h2/h1.

According to still another aspect of the present invention, there is provided a cathode of a secondary battery containing a plurality of carbon fibers, wherein the plurality of carbon fibers, according to Raman spectrum characteristic detected by irradiating laser having a wavelength of 514.5 nm, has a first peak of intensity of Raman scattering in which Raman shift is in a range of 1355±10 kaiser ($cm^{-1}$) and a second peak of intensity of Raman scattering in which Raman shift is in a range of 1580±10 kaiser, wherein a Full-Width Half-Maximum (FWHM2) of the first peak and a Full-Width Half-Maximum (FWHM1) of the second peak satisfy a relation that FWHM2/FWHM1≦1.2, and wherein a relative intensity h2, which is difference between background intensity and intensity of the Raman scattering at the first peak, and a relative intensity h1, which is difference between background intensity and intensity of the Raman scattering at the second peak, satisfy a relation that 1.3≦h2/h1.

According to still another aspect of the present invention, there is provided a body for a hydrogen storing, containing a plurality of carbon fibers, wherein the plurality of carbon fibers, according to Raman spectrum characteristic detected by irradiating laser having a wavelength of 514.5 nm, has a first peak of intensity of Raman scattering in which Raman shift is in a range of 1355±10 kaiser ($cm^{-1}$) and a second peak of intensity of Raman scattering in which Raman shift is in a range of 1580±10 kaiser, and wherein a Full-Width Half-Maximum (FWHM2) of the first peak and a Full-Width Half-Maximum (FWHM1) of the second peak satisfy a relation that FWHM2/FWHM1≦1.2.

According to still another aspect of the present invention, there is provided a body for a hydrogen storing, containing a plurality of carbon fibers, wherein the plurality of carbon fibers, according to Raman spectrum characteristic detected by irradiating laser having a wavelength of 514.5 nm, has a first peak of intensity of Raman scattering in which Raman shift is in a range of $1355\pm10$ kaiser ($cm^{-1}$) and a second peak of intensity of Raman scattering in which Raman shift is in a range of $1580\pm10$ kaiser, and wherein a relative intensity h2, which is difference between background intensity and intensity of the Raman scattering at the first peak, and a relative intensity h1, which is difference between background intensity and intensity of the Raman scattering at the second peak, satisfy a relation that $1.3 \leq h2/h1$.

According to still another aspect of the present invention, there is provided a body for a hydrogen storing, containing a plurality of carbon fibers, wherein the plurality of carbon fibers, according to Raman spectrum characteristic detected by irradiating laser having a wavelength of 514.5 nm, has a first peak of intensity of Raman scattering in which Raman shift is in a range of $1355\pm10$ kaiser ($cm^{-1}$) and a second peak of intensity of Raman scattering in which Raman shift is in a range of $1580\pm10$ kaiser, wherein a Full-Width Half-Maximum (FWHM2) of the first peak and a Full-Width Half-Maximum (FWHM1) of the second peak satisfy a relation that FWHM2/FWHM1$\leq$1.2, and wherein a relative intensity h2, which is difference between background intensity and intensity of the Raman scattering at the first peak, and a relative intensity h1, which is difference between background intensity and intensity of the Raman scattering at the second peak, satisfy a relation that $1.3 \leq h2/h1$.

BRIEF DESCRIPTION OF THE DRAWINGS

FIGS. 16A, 16B and 16C are schematic diagrams showing configuration of Graphite nanofiber.

DETAILED DESCRIPTION OF THE PREFERRED EMBODIMENT

Figure 1A:
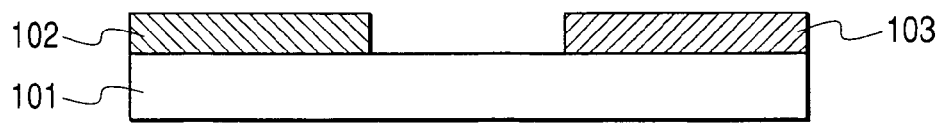
FIGS. 1A, 1B, 1C, 1D and 1E show examples of the process of making electron emitting elements using catalytic particles of the present invention.

An embodiment of catalyst and method of making the catalyst, carbon fiber formed using the catalyst, and electron emitting device, cathode of a secondary battery, body for hydrogen storing, electron source and image forming apparatus using a carbon fiber according to the present invention is described in detail. But, size, material, shape and relative position of units described below do not limit the scope of the invention, if not mentioning specific limitation. The making process described below is also not unique.

First of all, the catalyst of the present invention is explained.

The catalyst of the present invention particularly contains Pd used for growth of carbon fiber (promoting growth of carbon fiber), and at least one element of Fe, Co, Ni, Y, Rh, Pt, La, Ce, Pr, Nd, Gd, Th, Dy, Ho, Er and Lu is added to the catalyst. And, in case of being used to form carbon fiber, the catalyst is preferable and important in the viewpoint that it controls shape such as diameter of the carbon fiber of a particle state.

Among the elements added in combination with Pd, it is preferred that at least any of Fe, Ni and Co is added, and combination of Pd and Co is more preferable. If the carbon fiber is made using catalytic particles containing Pd and any selected element among Fe, Ni and Co and applied the obtained carbon fiber to an electron emitting device, it is possible to obtain very excellent applied voltage-electron emission current characteristics. At the same time, it is also possible to obtain stable electron emitting characteristic for a long time. In addition, it is also preferred that the added element (Fe, Ni or Co) composes the catalytic particles in an alloy state with Pd to make a plurality of carbon fibers stably with high uniformity.

At this time, the term "carbon fiber" in the present invention means fiber containing carbon as a main component or carbon in state of fiber. And, "carbon fiber" of the present invention includes carbon nanotube, graphite nanofiber, amorphous carbon fiber and diamond fiber. And, as described later, in the electron emitting device of the present invention, graphite nanofiber is preferably used among the carbon fibers in aspect of its electron emission characteristic.

The reason that Pd is used as a component in the present invention is as followed.

Though other catalysts except Pd become oxide by reaction with moisture and oxygen in atmosphere as soon as they are exposed to the atmosphere, Pd catalyst maintains metallic combining state more stably rather than other catalysts.

Particularly, the metallic catalytic particles in Fe group have danger of explosion due to abrupt chemical reaction when being exposed to the atmosphere, while the metallic Pd catalyst does not have such danger. And, metallic catalysts containing Co, Ni, Fe or the like added to Pd progress oxidation reaction slowly, so enabling to treat the catalyst safely.

On the other hand, Pd shows a unique behavior related to nature of easily receiving hydrogen in the catalyst. If exposing Pd to deoxidization circumstance of such as hydrogen or organic gas, particles containing hydrogen are combined each other at a relatively low temperature (more than about 450° C.) to be particles having bigger shape than that of an initial state. Owing to such phenomenon, there are caused some problems for Pd particles changing into bigger shape in the facts that growth temperature of carbon fiber is raised and threshold of electron emission is increased.

To avoid such problems, there is a method of not exposing the catalyst to hydrogen or hydrocarbon until reaching at a temperature required for growth of carbon fiber, but there is found more effective method that prevent deformation to be larger particle by adding at least one of Fe, Co, Ni, Y, Rh, Pt, La, Ce, Pr, Nd, Gd, Th, Dy, Ho, Er and Lu (preferably Fe, Co or Ni) into Pd particles to be combined each other.

The above result is remarkable when a ratio of the added element to Pd is more than 5 atm % (atomic percentage). And, if the ratio (atomic percentage) of the added element to Pd exceeds 80 atm %, it tends to require deoxidization process such as active hydrogen addition or gets into a slow growth of the carbon fiber. In addition, if the ratio (atomic ratio) of the added element to Pd exceeds 80 atm %, crystal structure of the formed carbon fiber tends to be extremely changed since the catalyst has characteristics similar to the catalyst having 100% of added element. For that reason, the added element to Pd is preferably less than 80 atm %.

And, the catalyst of the present invention is preferably in a particle state in aspect of forming carbon fiber.

Furthermore, though described in detail later, when applying carbon fiber to the electron emitting device, one in which carbon fibers are arranged in high density (called as "film containing a plurality of carbon fibers") is applied to one electron emitting device. When forming such a film containing a plurality of carbon fibers with high uniformity and stability, it is essential that the element added to Pd contained in the catalytic particles of the present invention is an alloy state.

The present invention, though described in detail later, is to form a minute nucleus (catalyst particle (with a diameter of 1 to 100 nm)) with the above catalytic materials to thereby grow carbon fiber preferably applied to the electron emitting device through the nucleus (catalyst particle) by pyrolysis of hydrocarbon gas using the thermal CVD manner. At this time, there are used, for example, acetylene, ethylene, methane, propane, propylene and so on for the hydrocarbon gas. In addition, steam of organic agents such as ethanol and acetone are often used.

FIGS. 7, 8, 16A, 16B and 16C exemplarily show schematic diagrams of the film containing a plurality of carbon fibers obtained by decomposition of hydrocarbon gas using the catalyst particles of the present invention. In each figure, a shape of carbon fiber seen at an optical microscope level (~1000 times) are schematically shown to left, a shape at an scanning electron microscope (SEM) level (~30,000 times) to center, and a shape at a transmission electron microscope (TEM) level (~1,000,000 times) to right.

Figure 7:
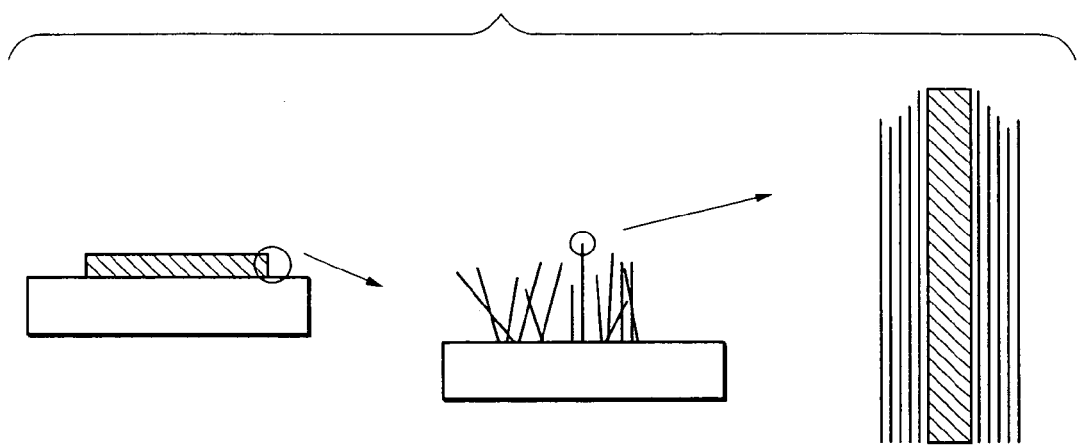
FIG. 7 is a schematic diagram showing configuration of a carbon nanotube.

As shown in FIG. 7, if graphene is in a cylindrical shape, it is called as carbon nanotube (if multi-layered cylindrical shape, it called as multi-wall nanotube), and the threshold required for electron emission is lowest when an end of the tube is opened.

Graphite nanofiber is schematically shown in FIGS. 8, 16A, 16B and 16C. This type of carbon fiber is composed as a multi-layered graphene. More specifically, as shown in the right schematic figure of FIG. 8, graphite nanofiber designates fiber-state material in which graphenes 23 are laminated to a longitudinal direction (fiber axis direction). Or, as shown in the right schematic figure of FIG. 8, it designates the fiber-state materials in which the graphenes 23 are arranged not parallel to the fiber axis. Even though the graven 23 is substantially perpendicular to the axis of fiber, it is included in graphite nanofiber in the present invention.

In addition, the first crossed surface of graphite is called as "graphene" or "graphene sheet". More specifically, graphite is made by laminating carbon planes, which is formed by the covalent bond of carbon atoms by $sp^2$ hybridization (trigonal hybridization) and arranged as if regular hexagons are laid, with maintaining a distance ideally of 3.354 Å. This carbon plane is called as "graphene" or "gafensheet".

In case the above carbon fiber is used as electron emitting device, the threshold of this electron emission is about 1V to 10V/μm, which is preferably as the electron emitting materials.

And, in case of forming the electron emitting device using carbon fiber, the film containing a plurality of carbon fibers are used for one electron emitting device. However, when such a film containing a plurality of carbon fiber is used, graphite nanofiber is preferably used as carbon fiber. It is because the electron emitting device in which the film containing a plurality of graphite nanofibers is used as an electron emitting film may obtain greater electron emission current density rather than the case of using carbon nanotube.

In addition, when the electron emitting device is used as, for example, a display and an electron source, it is required to maintain the good electron emission characteristic for a long time. As a result of investigation conducted by the inventors, it has been found that it is possible to maintain the good electron emission characteristic of the electron emitting device using the film containing a plurality of carbon fibers if Raman spectrum analysis of the film gives a specific result.

Figure 11:
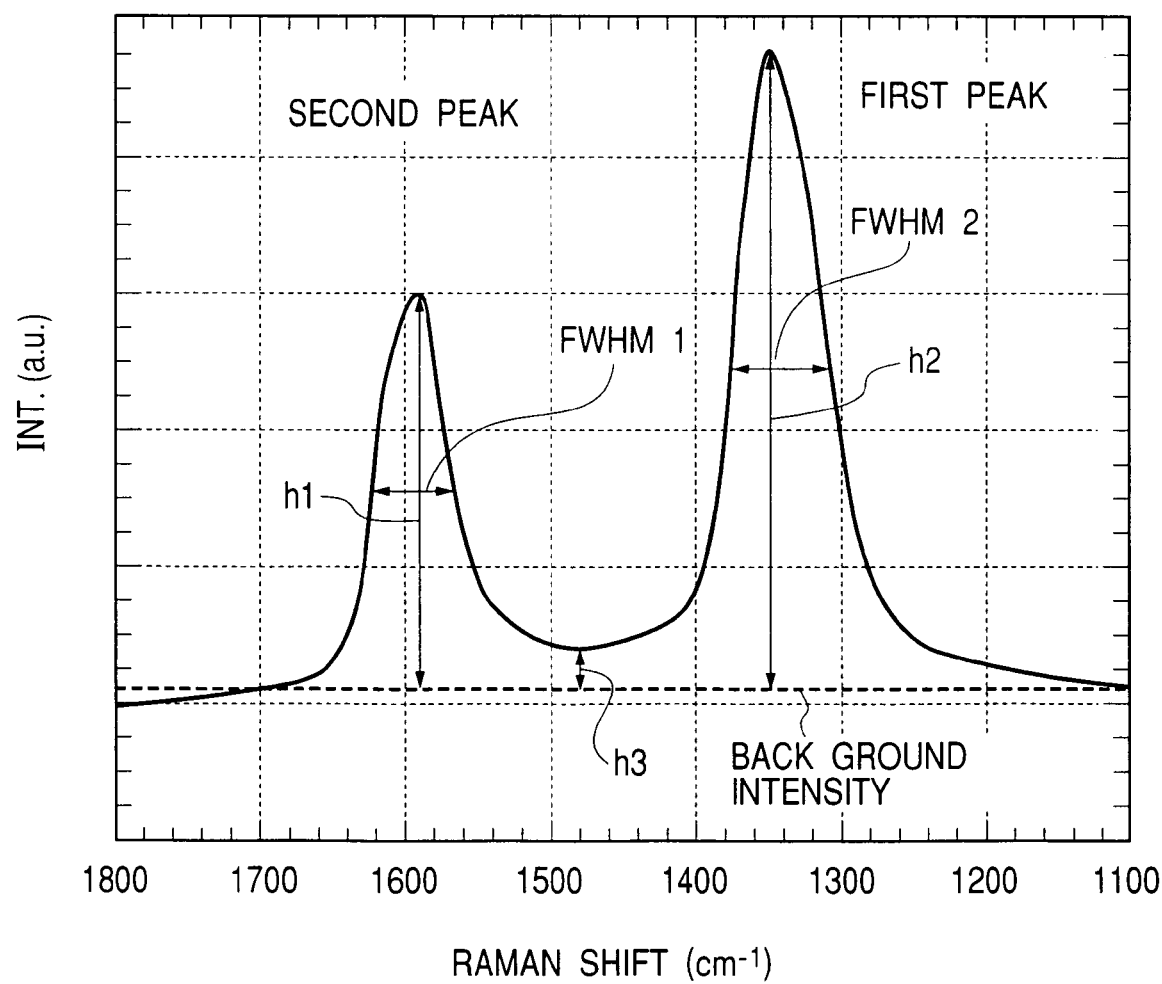
FIG. 11 is a graph showing Raman Spectra of the electron emitting element of the present invention.

FIG. 11 shows characteristics remarkably appeared in the film containing a plurality of carbon fibers in which the film may maintain the good electron emission characteristic for a long time. Specifically, it schematically shows intensity distribution characteristic (Raman Spectra) of Raman scattering (scattered light) detected when irradiating laser with a wavelength of 514.5 nm to the film containing a plurality of carbon fibers of the present invention. In addition, in FIG. 11, a horizontal axis designates deviation extent (called as "Raman Shift") of frequency of Raman scattering from Rayleigh scattering, while a vertical axis designates intensity of Raman scattering.

As shown in FIG. 11, the film containing a plurality of carbon fibers of the present invention shows a clear peak ("first peak") of Raman scattering intensity when Raman shift is in range of 1355±10 kaiser ($cm^{-1}$), and a clear peak ("second peak") of Raman scattering intensity when Raman shift is in range of 1580±10 kaiser ($cm^{-1}$). It's believed that the first peak may be corresponded to so-called "D band", while the second peak may be corresponded to so-called "G band".

And, the film containing a plurality of carbon fibers of the present invention, as shown in FIG. 11, has a relative intensity h2, which is a difference between Raman scattering intensity of the first peak and background intensity (baseline), at least 1.3 times of a relative intensity h1, which is a difference between Raman scattering intensity of the second peak and background intensity. And more preferably, in the film containing a plurality of carbon fibers of the present invention, a relative intensity h2, which is a difference between Raman scattering intensity of the first peak and background intensity (baseline), is 1.3 times or more and 2.5 times or lower of a relative intensity h1, which is a difference between Raman scattering intensity of the second peak and background intensity.

In addition, in this invention, the background intensity designates one connecting Raman scattering intensity at 1100 $cm^{-1}$ and Raman scattering intensity at 1700 $cm^{-1}$ in a straight line in an averaged result of an actual measured Raman spectrum graph.

And, the film containing a plurality of carbon fibers of the present invention satisfies the relation between Full-Width Half-Maximum of the first peak FWHM2 and Full-Width Half-Maximum of the second peak FWHM1 that FWHM2/FWHM1≦1.2.

And preferably, the film containing a plurality of carbon fibers of the present invention satisfies the relation between Full-Width Half-Maximum of the first peak FWHM2 and Full-Width Half-Maximum of the second peak FWHM1 that FWHM2/FWHM1≦1.2, and has a relative intensity h2, which is a difference between Raman scattering intensity of the first peak and background intensity (baseline), at least 1.3 times of a relative intensity h1, which is a difference between Raman scattering intensity of the second peak and background intensity. And more preferably, the film containing a plurality of carbon fibers of the present invention satisfies the relation between Full-Width Half-Maximum of the first peak FWHM2 and Full-Width Half-Maximum of the second peak FWHM1 that FWHM2/FWHM1≦1.2, and a relative intensity h2, which is a difference between Raman scattering intensity of the first peak and background intensity (baseline), is 1.3 times or more and 2.5 times or lower of a relative intensity h1, which is a difference between Raman scattering intensity of the second peak and background intensity.

More preferably, the film containing a plurality of carbon fibers of the present invention has a relative intensity h3, which is a difference between a minimum intensity between the first peak and the second peak (or between D band and G band) of Raman scattering intensity and the background intensity, 1/10 or lower of a relative intensity h2, which is a difference between a minimum intensity of Raman scattering intensity having the first peak, in addition to each of the above characteristics (the Full-Width Half-Maximum of the first peak and the second peak and/or the intensity ratio between the first peak and the second peak). And, more preferably, the relative intensity h3 is 1/15 or lower of the relative intensity h2.

As described above, by the fact that the minimum intensity h3 of Raman scattering intensity is 1/10 or lower, particularly 1/15 or lower, of Raman scattering intensity having the first peak in relation of the first peak and the second peak (or D band and G hand), crystallization of the carbon fiber is improved and thus it is possible to maintain the good electron emission characteristic for a long time.

The electron emitting device using the film containing a plurality of carbon fibers of the present invention satisfying the above conditions has greater initial electron emission current density, as described below, or lower deterioration of the electron emission characteristic with time, and may become an electron emitting device with good life characteristic. Though the reason that the good life characteristic is obtained for a long time is not clear, it is judged in the present invention that the relation with h3 is also one of important factors in addition to the relation between h1 and h2 and the relation between FWHM1 and FWHM2. In addition, the relation between h2 and h3 gives a stability of electron emitting characteristic.

Now, an example of methods for making the film containing a plurality of carbon fibers is described. But, size, material, shape, relative position, used gas and chemicals of units described below are just one example, but not intended to limit the scope of the present invention.

The film containing a plurality of carbon fibers with the above Raman shift characteristics can be obtained by growing carbon fibers through the below-described catalytic particles of the present invention (particularly, particles comprising Pd and Co alloy or particles comprising Pd and Ni alloy).

The electron emitting device using particularly graphite nanofiber among carbon fibers made using the catalytic particles of the present invention is not limited to device configuration shown in FIG. 2 described later, and may generate electron emission at a low electric field, and be able to obtain large emitting currents, and be easily manufactured, and have stable electron emission characteristics.

Figure 8:
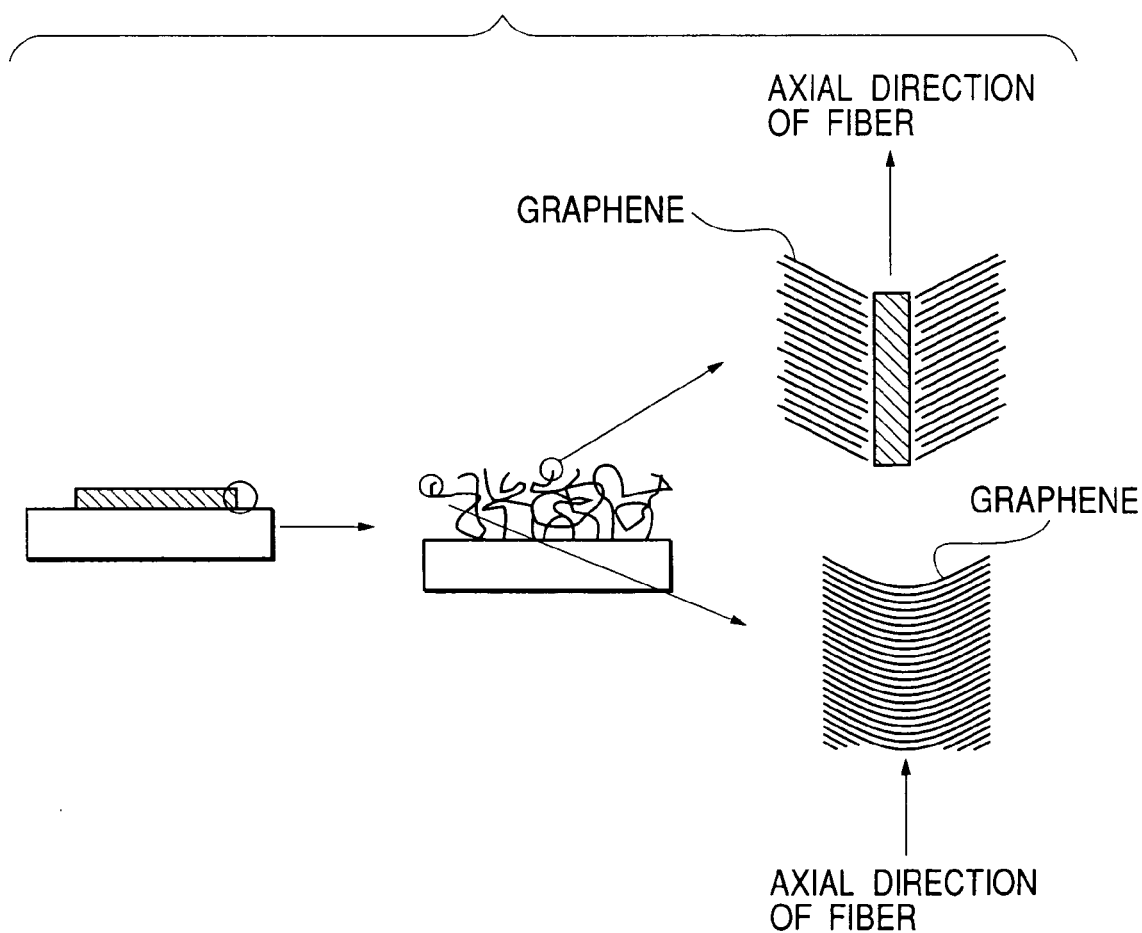
FIG. 8 is a schematic diagram showing configuration of a graphite nanofiber.

Graphite nanofiber, differently to carbon nanotube and so on, has fine convex and concave protrusions on a surface (a side of fiber) as shown in FIG. 8 or the like, so thus it is thought that electric field concentration may be easily appeared and the electron will be easily emitted. And, it is also considered that the electron emission would be easier since graphene has an extended shape from a central axis of the fiber toward outside (surface) of the fiber. One carbon nanutube is chemically inert since the side of fiber is basically corresponding to (002) plane of graphite and does not have protrusion like the graphite nanofiber, so it could be thought that electron emission is not easy at the side of fiber. For that reason, graphite nanofiber among carbon fibers is considered preferable for the electron emitting device.

For example, it is possible to set the film containing a plurality of graphite nanofiber as an emitter and then make an electron emitting device by providing electrode (gate electrode) for controlling electron emission from this emitter. Then, by arranging a light emitting member, which emits light by irradiation of electrons emitted from the graphite nanofiber, on a trajectory of the electrons, a light emitting device such as lamp may be formed. In addition, it is also possible to configure an image display device such as display by arranging a plurality of electron emitting devices using the film containing a plurality of graphite nanofibers as well as preparing anode electrode having a light emitting member such as fluorescent substance. The electron emitting device, light emitting device or image display device using the graphite nanofiber of the present invention may stably emit electrons without maintaining inner in an ultra-high-vacuum state as the conventional electron emitting device does, and since they emits electrons at a lower electric field, very reliable devices may be manufactured very conveniently.

And, particularly, when arranging a plurality of catalytic particles of the present invention and then applying the electric field intensity of $1 \times 10^5$ V/cm between the anode electrode and the film containing a plurality of graphite nanofiber grown from the catalytic particles, a density of $10^3$ number/cm$^2$ can be obtained at electron emission site.

As an example of the methods of making the catalyst (particularly, particulate catalyst) of the present invention, there is vacuum coevaporation, and specifically it is possible to make the catalyst by using Pd as a first evaporation source of the vacuum evaporation and at least one element selected in the group consisting of Fe, Co, Ni, Y, Rh, Pt, La, Ce, Pr, Nd, Gd, Th, Dy, Ho, Er and Lu as a second evaporation source of the vacuum evaporation.

As for the vapor evaporation, there may be used electron beam evaporation, resistance heating evaporation, sputter method and so on, but the sputter method is preferably used. In this case, though it is a unified sputter device, the catalyst of the present invention can be manufactured by putting components, added to Pd target, on each test piece and then sputtering them.

In addition, there is also a liquid coating method for making the catalyst, in which the catalyst of the present invention is made by coating blended solution of a first liquid containing Pd and a second liquid containing at least one element selected in the group consisting of Fe, Co, Ni, Y, Rh, Pt, La, Ce, Pr, Nd, Gd, Th, Dy, Ho, Er and Lu on a substrate and then drying or heating it.

Now, an example of electron emitting device using carbon fiber formed using the catalytic particles of the present invention is described with reference to schematic views shown in FIGS. 1 and 2. At this time, the catalyst of the present invention is in a particle state for example.

Figure 2A:
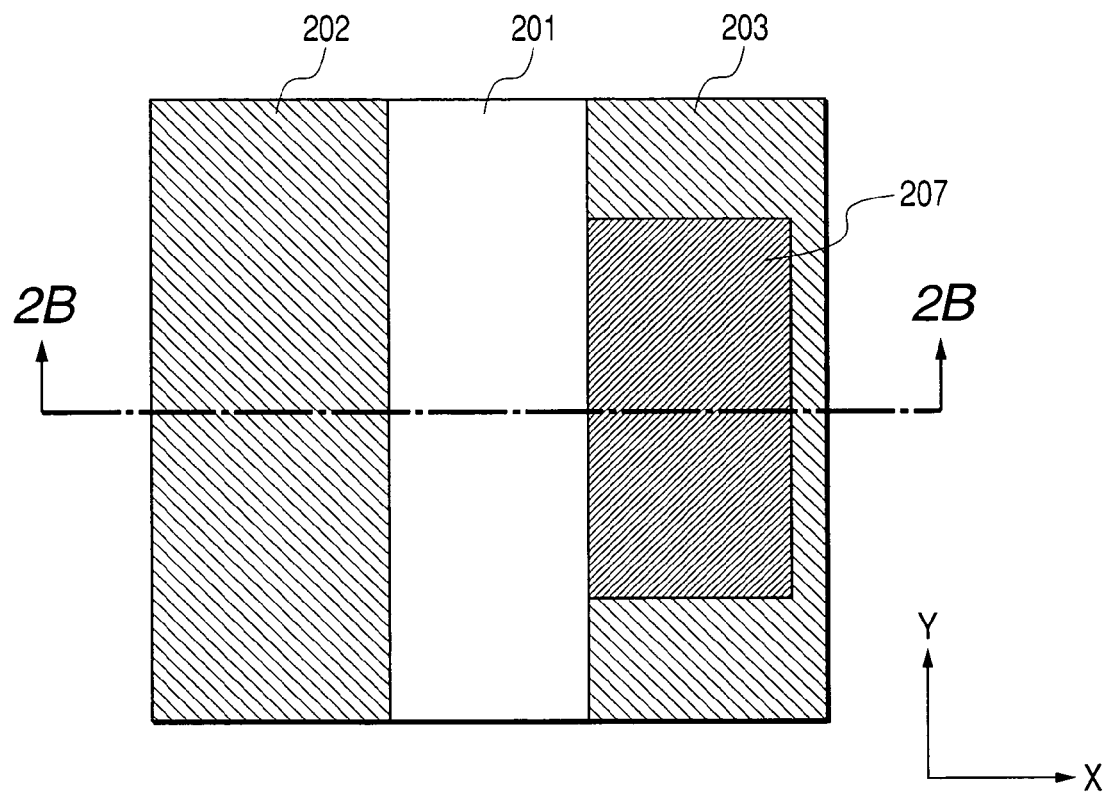
FIGS. 2A and 2B are plane view and sectional view showing an example of the electron emitting element using the catalytic particles of the present invention.
Figure 2B:
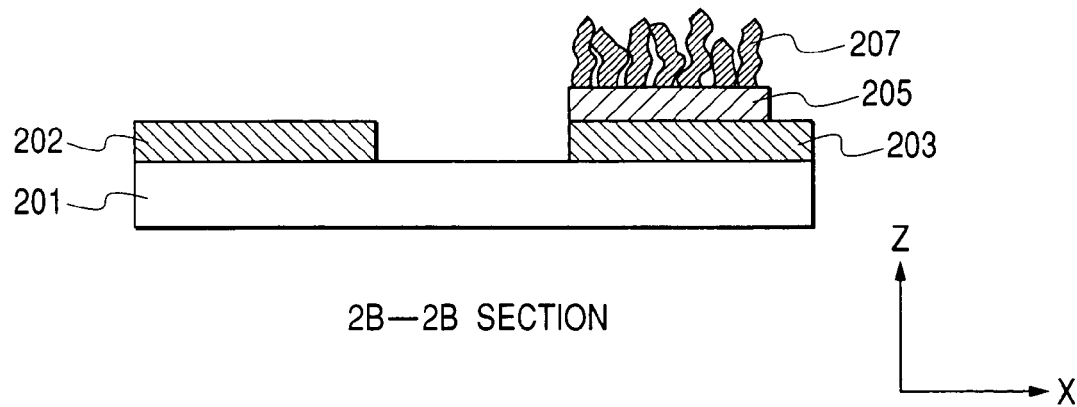

FIG. 2A is a schematic plane view showing an example of configuration of electron emitting device using the film containing a plurality of carbon fibers of the present invention, while FIG. 2B is a schematic sectional view taken along 2B-2B line of FIG. 2A.

In FIGS. 2A and 2B, 201 denotes an insulation substrate, 202 denotes a drawer electrode (gate electrode), 203 denotes a cathode electrode, 207 denotes a carbon fibers, which is a material of an emitter, and 205 denotes a conductive material layer, which is made by growth of the carbon fiber 207 through the catalytic particles. This conductive material layer 205 is not essential. Though the cathode electrode 203 is piled over the conductive material layer 205 on which the catalytic particles are arranged, it is also possible to arrange the catalyst of the present invention on a surface of the cathode electrode 203 without the conductive material layer 205. In other words, it is also possible that the carbon fiber 207 is arranged on the surface of the cathode electrode 203.

As for the insulation substrate 201, an insulation substrate using such as quartz glass of which surface is sufficiently cleaned can be used.

The gate electrode 202 and the cathode electrode 203 are conductive, and formed by a general vacuum film forming technique such as evaporation and sputtering or a photolithography technique. As a material, carbon, metal, nitride of metal, carbide of metal and so on, which have heat resistance, are preferable.

The material of emitter (carbon fiber) 207 is carbon fiber such as carbon nanotube, graphite nanofiber or the like, grown using the catalytic particles including Pd and additionally at least one of Fe, Co, Ni, Y, Rh, Pt, La, Ce, Pr, Nd, Gd, Th, Dy, Ho, Er and Lu. Among the additional components, Fe, Co and Ni are preferably used to obtain effects of the present invention. And, particularly, combination of Co and Pd is preferable. Also, it is required that Pd and the component (at least one of Fe, Co, Ni, Y, Rh, Pt, La, Ce, Pr, Nd, Gd, Th, Dy, Ho, Er and Lu) combined with Pd are alloyed in aspect of forming the carbon fiber of the present invention having high uniformity and reproduction.

Hereinafter, an example of making the electron emitting element of the present invention shown in FIG. 2 is described in detail with reference to FIG. 1.

(Step 1)

After cleaning the substrate 101 sufficiently, an electrode layer with, for example, a thickness of 500 nm is formed on the full substrate to form the gate electrode 102 and the cathode (emitter) electrode 103. Quartz glass, glass partially replaced with K in which impurity contents of such as Na is reduced, a substrate in which $SiO_2$ is laminated on a silicon substrate, and a ceramic substrate of such as alumina can be used for the insulation substrate 101.

Then, positive type photoresist is used to form resist pattern in a photolithography process. The electrode layer is dry-etched using Ar gas while the patterned photoresist is used as a protective mask. Thus, the gate electrode 102 and the cathode electrode 103 with a gap (between the electrodes 102 and 103) 51 μm are formed (FIG. 1A). Materials of the gate electrode 102 and the cathode electrode 103 are selected from, for example, carbon, metal, nitride of metal, carbide of metal, metallic boron, semiconductor and metal compound of semiconductor. Materials of the gate electrode 102 and the cathode electrode 103 are preferably carbon, metal, nitride of metal, carbide of metal and so on, which have heat resistance. Thickness of the gate electrode 102 and the cathode electrode 103 may be set in range from several tens of nm to several tens of μm.

Hereinafter, patterning of film or resist using the photolithography process, film forming, lift-off, etching and so on is called simply as "patterning".

(Step 2)

Figure 1B:
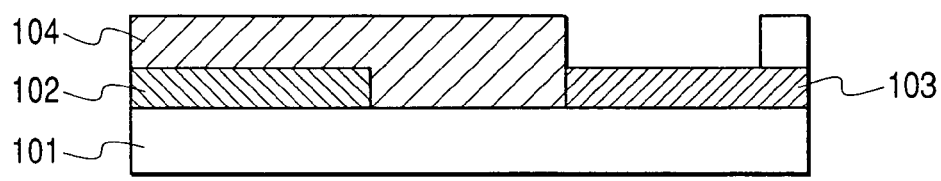

The resist pattern 104 is formed using negative type photoresist used for lift-off of an upper layer in the photolithography process (FIG. 1B).

Then, in this example, a conductive material layer 105 is formed on the cathode electrode. In case of arranging the conductive material layer 105, it is preferred to use nitride of at least one of Ti, Zr, Ta and Nb as its material. Particularly, TiN is preferred in aspect of growing the carbon fiber stably.

Figure 1C:
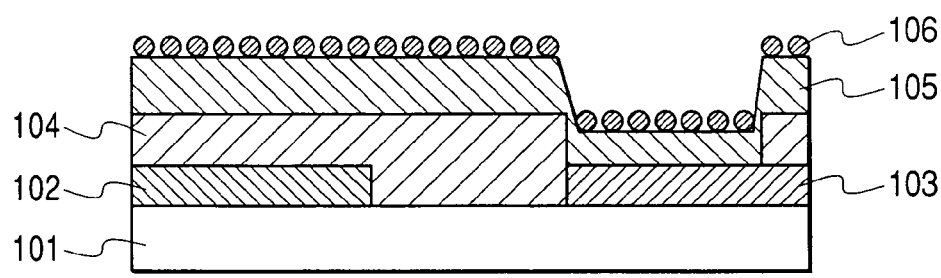

And then, the catalyst 106 of the present invention is formed on the conductive material layer 105 by using the above-described vacuum evaporation or liquid coating and so on (FIG. 1C). In order to arrange the catalyst of the present invention in a particle state, there can be used a method of spin coat of liquid containing ultrafine particles or a method of forming a catalytic layer by sputtering and then making it into particles by heating and aggregation under hydrogen circumstance. In the electron emitting device, the method using aggregation by heating under the hydrogen circumstance with assuring sufficient electric contact between the carbon fiber and the cathode electrode is preferred.

The catalytic particle of the present invention has a diameter 1 nm or more and 100 nm or lower, and more preferably 10 to 80 nm. In order to make the catalyst having such a diameter, the catalyst is piled to a thickness of 1 nm or more and 100 nm or lower, and then heated under hydrogen circumstance.

(Step 3)

Figure 1D:
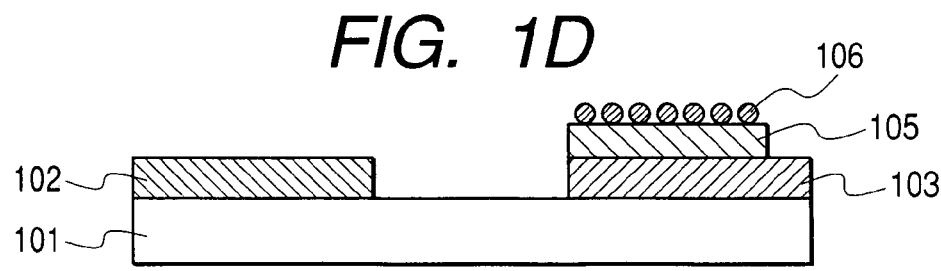

By lifting off the conductive material layer 105 and the catalytic particle 106 on the resist through use of separation liquid of the resist patterned in the process 2, the conductive material layer 105 and the catalytic particle 106 are patterned as desired (FIG. 1D).

(Step 4)

Then, the substrate on which the gate electrode 102, the cathode electrode 103 and the catalytic particle 106 are arranged is heat-treated under circumstance including gas having carbon. And, as for the gas having carbon, hydrocarbon gas is preferably used. As for hydrocarbon gas, a gas selected among acetylene, ethylene, benzene and acetone is preferably used. And, it is also preferred that the hydrocarbon gas is in contact with the substrate 1 with being mixed with hydrogen. And, such heating (heat treatment) is conducted at a temperature of 400° C. or higher and 800° C. or lower.

Figure 1E:
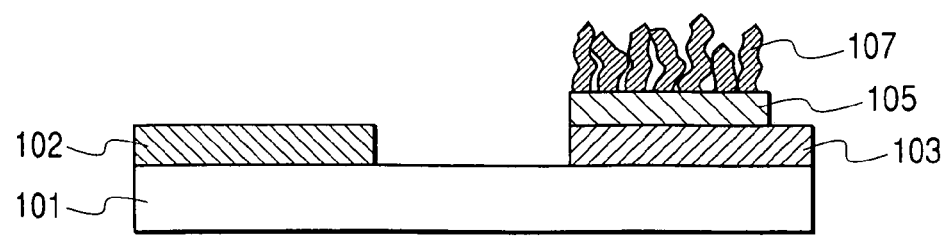

If observing a surface of the conductive material layer 105 with SEM (a scanning electronic microscope) after such treatment, it would be understood that a plurality of carbon fibers are formed (FIG. 1E). In the present invention, the region created by arrangement of a plurality of carbon fibers is called as "a film containing a plurality of carbon fibers". In the present invention, fiber used for particularly the electron emitting element preferably has a diameter of 5 nm or more and 100 nm or lower, and more preferably 10 or more and 30 nm or lower. Deviating this range may cause decrease of the life and make it impossible to obtain sufficient emission current.

The electron emitting device using the film containing a plurality of carbon fibers, as constructed above, is explained with reference to FIGS. 3 and 4.

Figure 3:
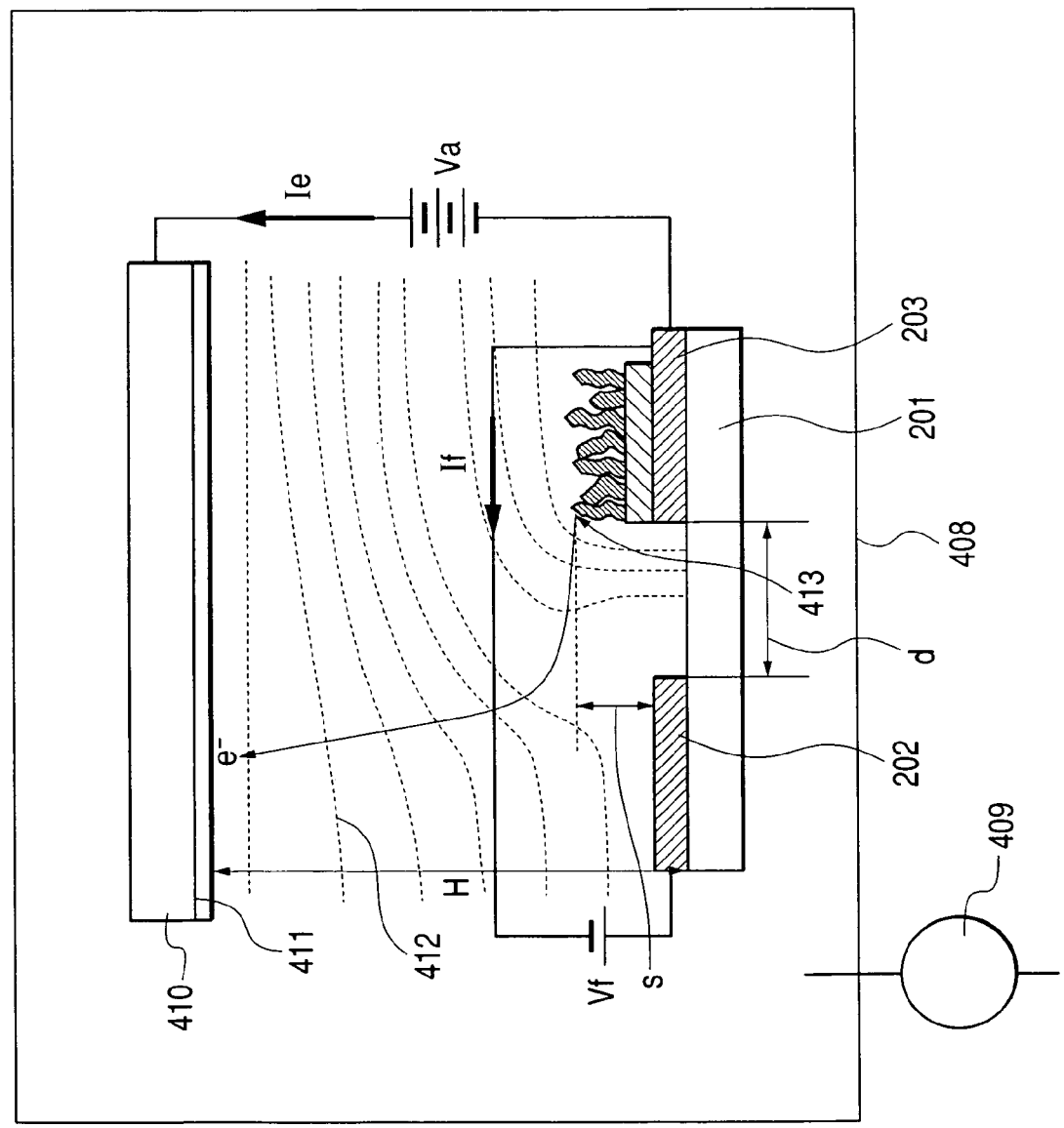
FIG. 3 is a diagram for illustrating operation when driving the electron emitting element of the present invention.

The device in which the gate electrode and the cathode electrode are spaced apart as much as a gap of several μm is installed to a vacuum device 408 as shown in FIG. 3, and a vacuum exhaust device 409 exhausts gas until reaching at about $10^{-4}$ Pa. As shown in FIG. 3, the anode electrode 410 is installed to a height H of several mm from the substrate by using a high voltage power source to apply high voltage $V_a$ of several kVs (kilo-volts).

And, a phosphor 411 on which a conductive film is coated is installed to the anode 410.

At the device, device current $I_f$ and electron emission current $I_e$ flowing by applying pulse voltage of about several ten V as driving voltage $V_f$ are measured.

At this time, it is thought that an equipotential line 412 is formed as shown in FIG. 3. A point where the electric field is most concentrated is considered to be an inner space of the gap from the anode 410 of an electron emitting material (carbon fiber) designated by 413.

It is also thought that electrons are emitted from a plurality of carbon fibers positioned near the electric field concentrated point.

Figure 4:
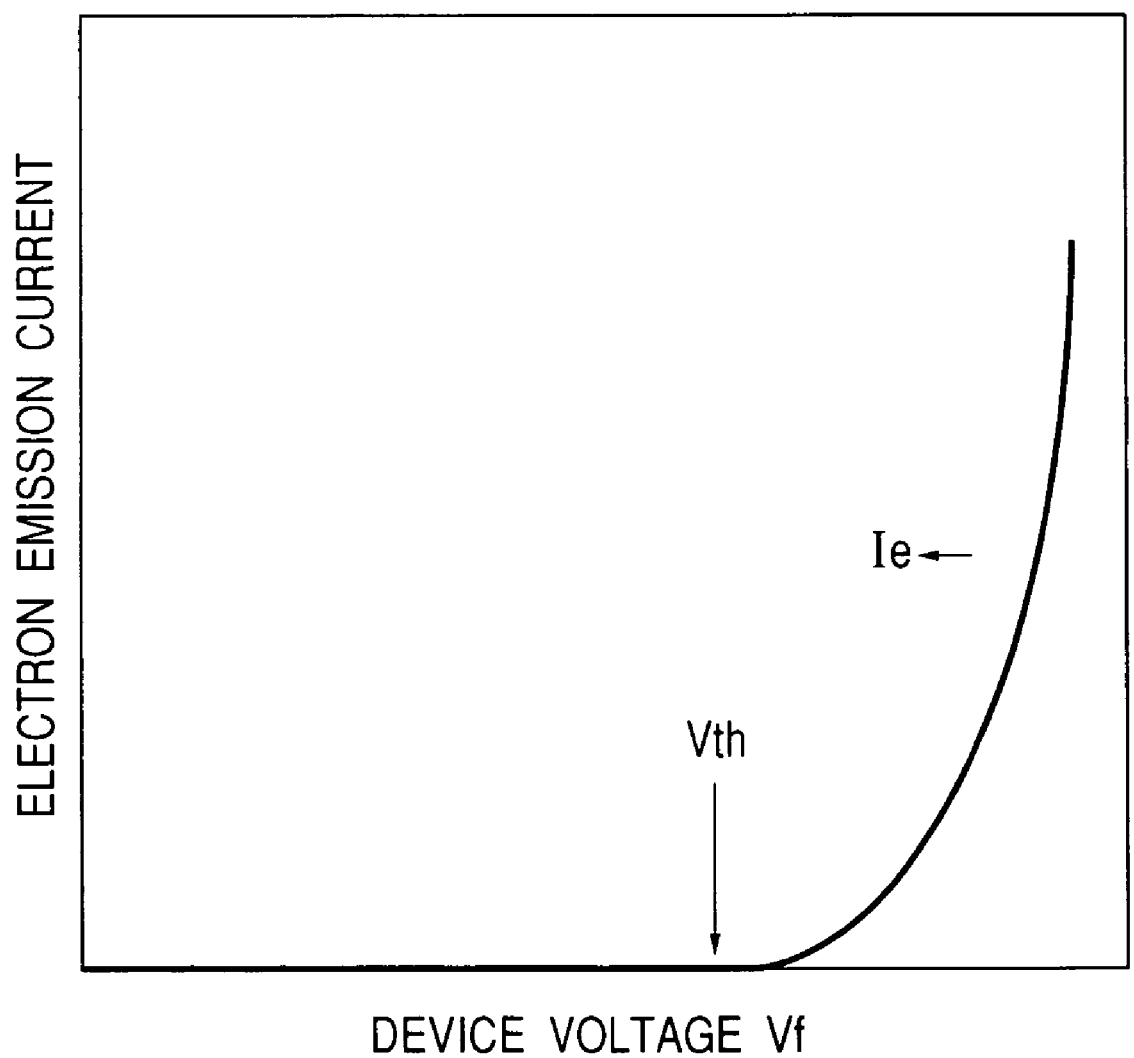
FIG. 4 is a graph illustrating basic operational characteristics of the electron emitting element of the present invention.

Electron emission characteristic of this electron emitting device is as shown in FIG. 4. In other words, $I_e$ (electron emission density) is abruptly increased from threshold voltage ($V_{th}$), and not-shown $I_f$ (current measured between the gate electrode and the cathode) has similar characteristics to $I_e$, but its value is sufficiently low, compared with $I_e$.

In the embodiment of the present invention as described above, the gate electrode 102(202) and the cathode 103(203) are arranged on a surface of the substrate 101(201).

The gap between the gate electrode 102(202) and the cathode 103(203) and the driving voltage (voltage applied between the gate electrode 2 and the cathode 3) are determined so that the electric field required for electron emission has a value 1 to 50 times of that of the horizontal electric field when comparing the vertical electric field required for electron emission from the carbon fiber with the vertical electrical field required for electron emission.

At this time, "the horizontal electric field" in the present invention means "an electric field to a direction substantially parallel to a surface of the substrate 101(201)" or "an electric field to a direction that the gate 102(202) and the cathode 103(203) are faced".

And, "the vertical electric field" mentioned above in the present invention means "an electric field to a direction substantially perpendicular to the surface of the substrate 101(201)" or "an electric field to a direction that the substrate 101(201) and the anode 411 are faced".

As described above, FIG. 3 is a schematic sectional view showing configuration when the anode 411 is arranged upon the electron emitting device and then the electron emitting device is driven. As shown in FIG. 3, in the electron emitting device of the present invention, assuming that a distance of the gap between the cathode 203 and the gate electrode 202 is d, a potential difference (voltage between the cathode 203 and the gate electrode 202) when driving the electron emitting element is $V_f$, a distance between surfaces of the anode electrode 411 and the substrate 201 on which the elements are arranged is H, and a potential difference between the anode 411 and the cathode 203 is $V_a$, it is considered that the electric field during driving (horizontal electric field; $E1 = V_f/d$) is 1 times or more and 50 times or lower of the electric field between the anode and the cathode (vertical electric field; $E2 = V_a/H$). As a result, electrons emitted from the cathode 203 collide with the gate electrode 202 may be decreased. Therefore, it may obtain high efficient electron emitting device with low spreading of the emitted electron beam.

In addition, as shown in FIGS. 2A, 2B and 3, in the electron emitting device using the film containing a plurality of carbon fibers of the present embodiment, it is preferred that a plane, which includes a surface of the film containing a plurality of carbon fibers and is substantially parallel to the surface of the substrate 201, is arranged in a position spaced apart from the substrate surface rather than the plane, which includes a part of the surface of gate electrode 202 and is substantially parallel to the surface of the substrate 202 in order to restrain scattering of electrons on the gate electrode 202 or irradiation of electrons toward the gate electrode.

In other words, in the electron emitting device (electron emitting apparatus) of this embodiment, the plane, which includes a part of the surface of the film containing a plurality of carbon fibers and is substantially parallel to the surface of substrate 1, is arranged between the anode 411 and the plane, which includes a part of the surface of the gate electrode 202 and is substantially parallel to the substrate surface.

And, in the electron emitting device (electron emitting apparatus) of this embodiment, a front end of the carbon fiber is arranged to a height "s" (which is defined as a distance between the plane, which includes a part of the surface of gate electrode 202 and is substantially parallel to the surface of substrate 201, and the plane, which includes the surface of the film containing a plurality of carbon fibers and is substantially parallel to the surface of substrate 201), as shown in FIG. 3.

The mentioned height "s" depends on a ratio of the vertical electrical field vs. the horizontal electrical field (the vertical electrical field/the horizontal electrical field), and the height is lowered as the ratio of the vertical electrical field vs. the horizontal electrical field is low, while bigger height is required as the horizontal electric field is increased. Practically, the height "s" is in range of 10 nm or more and 10 μm or lower.

And, the electron emitting device using the film containing a plurality of carbon fibers of the present invention may adopt various configurations in addition to the configuration shown in FIGS. 2A and 2B.

Figure 14:
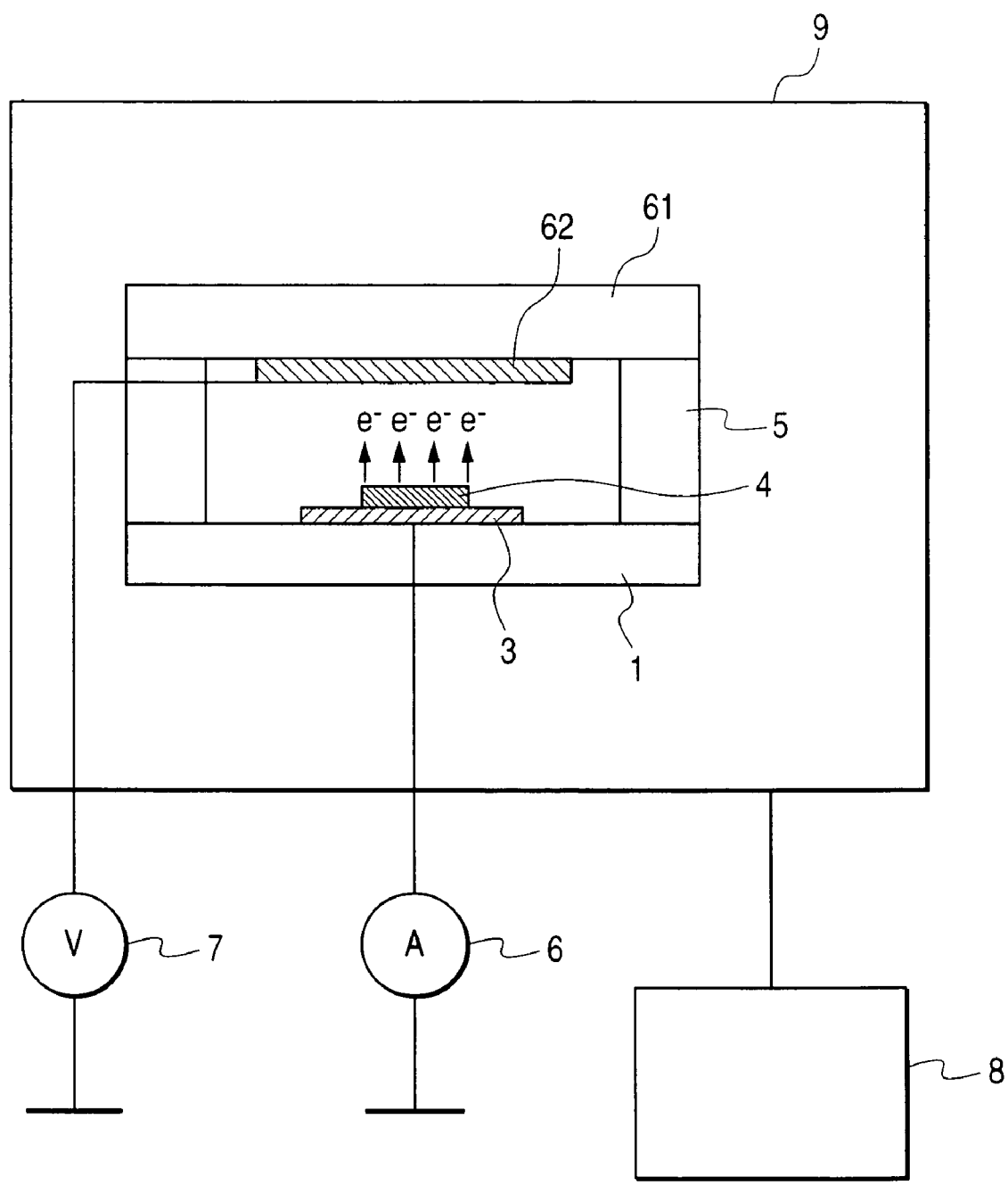
FIG. 14 is a schematic diagram showing configuration of the electron emitting element of the present invention.
Figure 15:
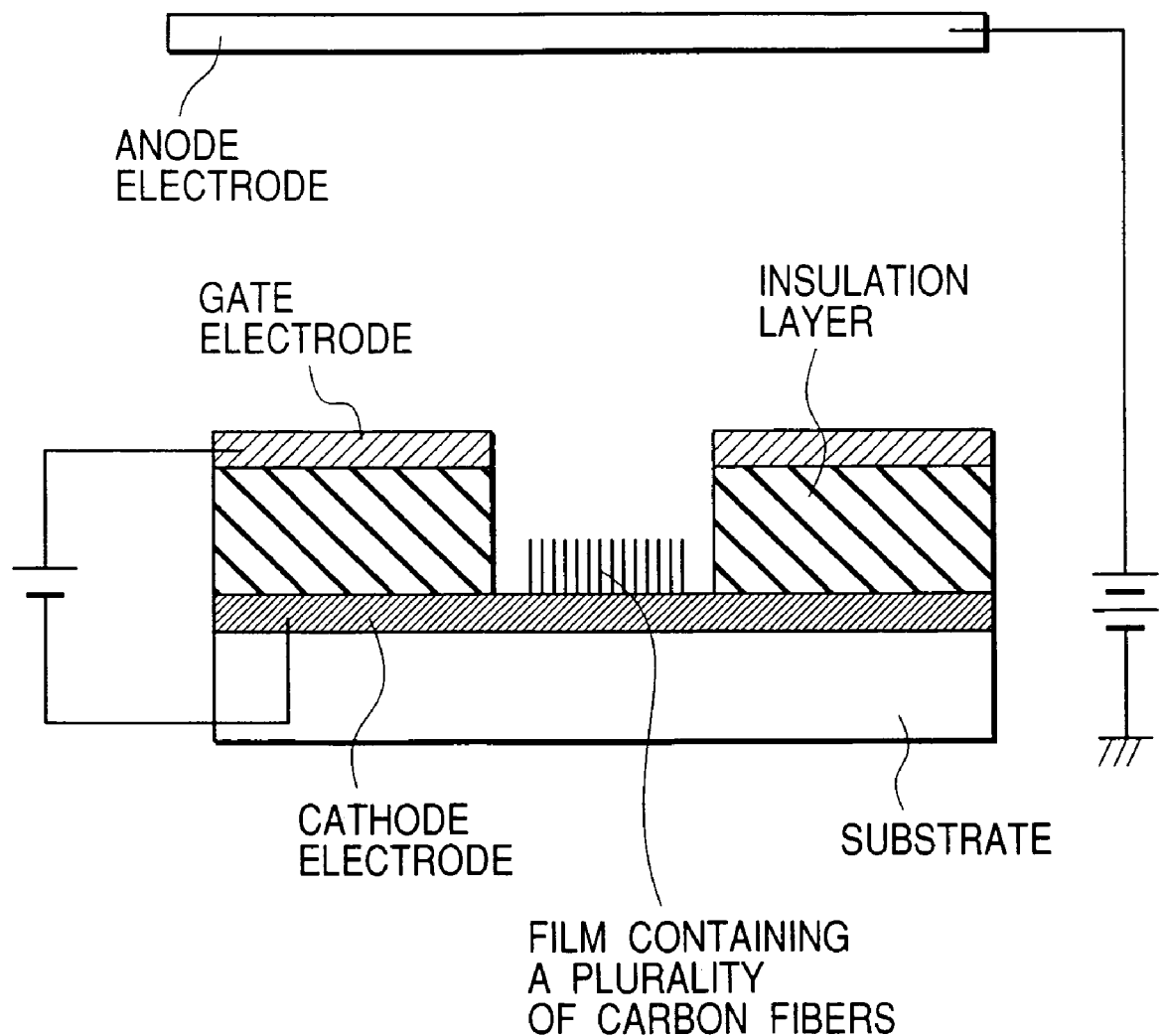
FIG. 15 is a schematic diagram showing configuration of the electron emitting element of the present invention.

For example, a cone-type emitter positioned in opening of the gate electrode of so-called Spindt-type electron emitting device as shown in FIG. 15 may be replaced with the film containing a plurality of carbon fibers. Or, it is also possible to arrange a film 4 containing a plurality of carbon fibers of the present invention on the cathode 3 arranged on the substrate 1 as shown in FIG. 14, position an anode 62 to be oriented to the substrate 1, and then apply electric field between the cathode 3 and the anode 62 so that electron may be emitted from the film 4 containing a plurality of carbon fibers of the present invention. Alternately, it is also possible in the configuration of the electron emitting element that a grid electrode for controlling electron emission is additionally positioned between the anode and the film containing a plurality of carbon fibers arranged on the cathode.

However, in the present invention, it is preferred to have configuration that the gate electrode and the cathode are arranged spaced apart on the substrate 1 so that the film containing a plurality of carbon fibers is positioned on the cathode, as shown in the sectional view of FIG. 2. By using the configuration of FIGS. 2A and 2B, it is possible to obtain the electron emitting device with high efficiency and lower spreading of the emitted electron beam.

In addition, though it is shown in FIG. 2 that the gate electrode 202 and the cathode 203 have identical thickness, the cathode may have greater thickness than that of the gate electrode in other configurations. Additionally, such configuration can be modified even if an insulation layer with a suitable thickness is arranged between the cathode and the substrate.

As for preferable content of Co included in the catalyst, the inventors have conducted investigation for different content of Co. As a result, it has been found that voltage width (amplitude voltage width) and threshold required for obtaining certain current is varied depending on concentration of Co. As a result, in the viewpoint of increased threshold and voltage width required to obtain certain current from carbon fiber, it is preferred to add at least 20% of Co to Pd. And, if a fraction of Co is less than 20 atm %, it is impossible to obtain good electron emission characteristic for a long time in the formed electron emitting device using the film containing a plurality of carbon fibers. In addition, it has been found that a minimum growth temperature of carbon fiber can substantially not obtained with a general substrate if a fraction of Co in the catalyst containing Pd and Co exceeds 80 atm %. It has also been found that, if a fraction of Co exceeds 80 atm %, stability is better but the electron emission characteristic is deteriorated. As a result, a fraction of Co in the catalyst containing Pd and Co is 20 atm % or more and 80 atm % or lower.

Figure 9:
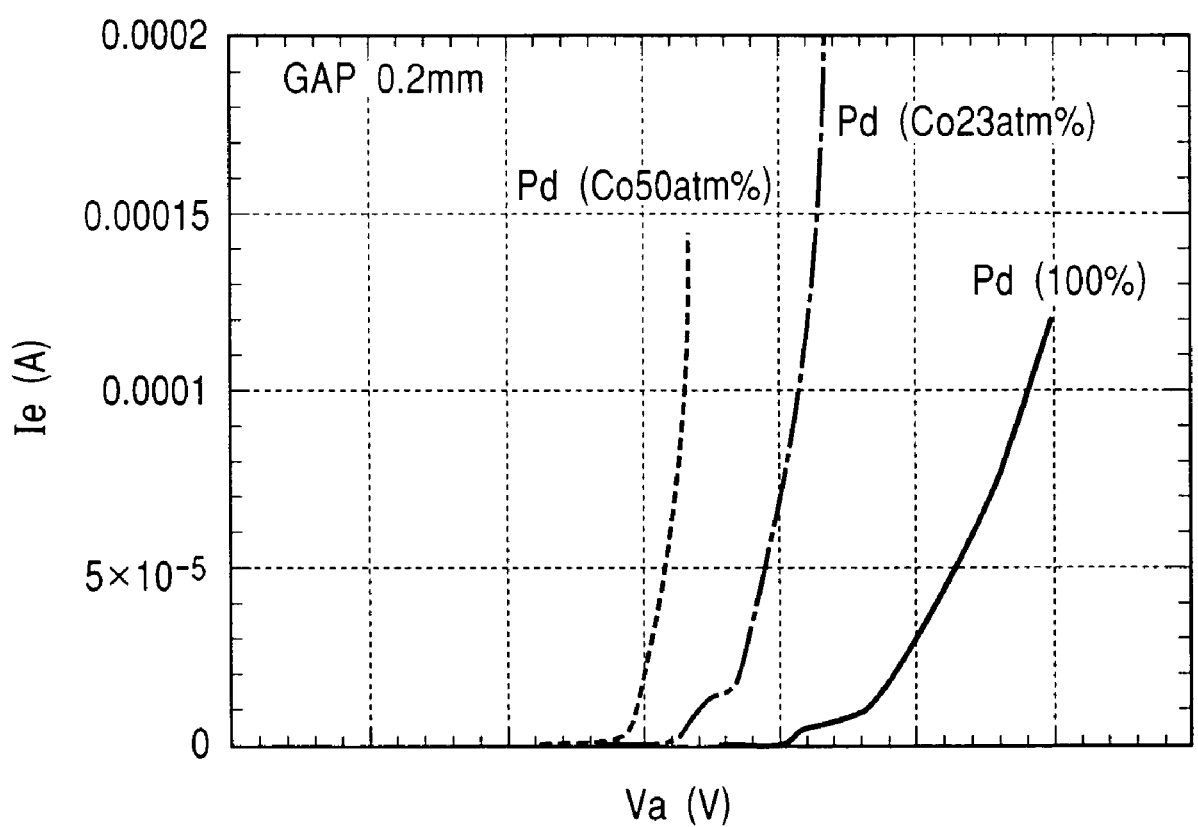
FIG. 9 is a graph showing characteristics of the electron emitting element of the present invention.

As a specific example, a measurement system is configured composed of parallel plate and so on by electrically connecting and the carbon fibers grown with different content (0%, 23%, and 50%) of Co added to Pd and then positioning them in a vacuum chamber, and then applying high positive voltage to a faced anode. FIG. 9 shows results measuring electron emission amounts emitted from the fiber in one embodiment of the present invention.

As shown in FIG. 9, in this example, one having the smallest amplitude voltage width (width of voltage required for obtaining certain current as the electron emission current $I_e$ increases from zero) is Co: 50 atm % for the smaller one. As this amplitude voltage width is smaller, cost for the device required for driving control is decreased. In detail, as a result of investigation with changed added contents, the amplitude voltage width is effectively lowered rather than the case of 100% of Pd when Co is or more 20 atm %. Therefore, the cost of driving device is reduced as the threshold is lower even for an increased threshold. As apparently understood in FIG. 9, it is observed that the threshold is lowered as the content of Co to Pd is increased.

On the other hand, a maximum content of Co to Pd is investigated in another aspect. In order to dissolve hydrocarbon gas using the catalyst, an oxidized film existing on a surface of the catalyst should be removed. Though the oxidized film is removed by exposing the catalyst to high temperature by using such as hydrogen, this removing temperature becomes one of factors determining the lowest limit of growth. After investigating the lowest limit of growth, the inventors have found that the lowest limit is about 400° C. at Pd: 100%, but about 410° C. at Co: 23 atm %, about 500° C. at Co: 50 atm % and about 600° C. at Co: 100%. As a result of investigation with more modified content of Co in more detail, it has been found that the minimum growth temperature is abruptly increased when a fraction of Co exceeds 80 atm %, which is substantially equal to the case of Co: 100%.

As easily understood from the results, when using the carbon fiber grown from the catalytic particles using materials including Pd and Co (more specifically, alloy of Pd and Co), a preferable concentration of Co is 20 to 80 atm %. Such a preferable range of concentration is equal for Fe and Ni, which are materials to be added to Pd.

Figure 5:
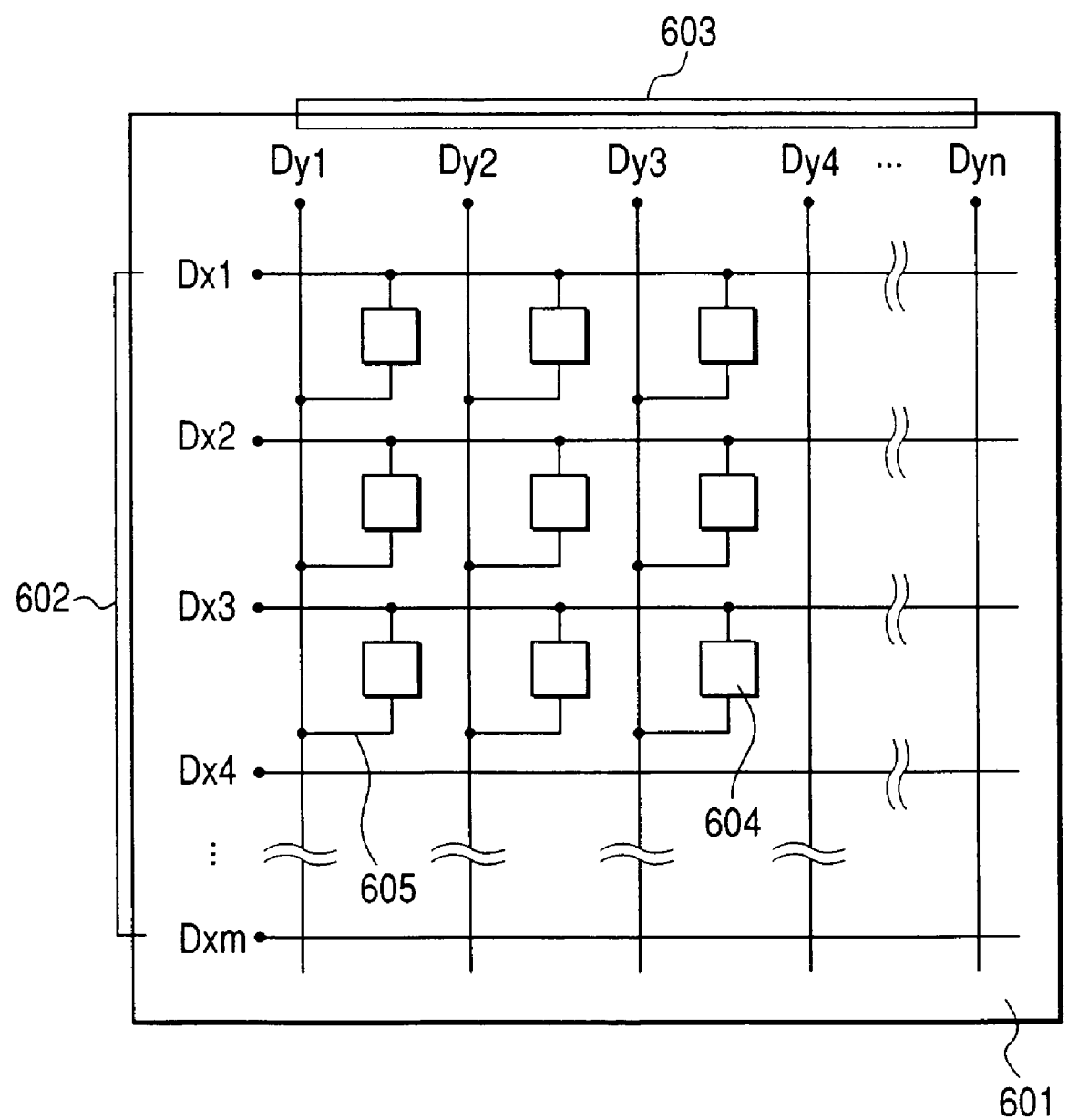
FIG. 5 shows an example of a passive matrix circuit using a plurality of electron sources of the present invention.

Now, the image forming apparatus obtained by arranging a plurality of electron emitting elements to which the present invention is applicable is described with reference to FIGS. 5 and 6. In FIG. 5, 601 denotes an electron source substrate, 602 denotes X-directional wire, 603 denotes Y-directional wire, 604 denotes the electron emitting device of the present invention and 605 denotes a wire connection.

In FIG. 5, m number of X-directional wires are composed of $DX_1, DX_2, \ldots, DX_m$. Material, film thickness and width are suitably designed. The Y-directional wires 603 includes n number of wires $DY_1, DY_2, \ldots, DY_n$, identical to the X-directional wire 602. An insulation interlayer, not shown, is arranged between m number of the X-directional wires 602 and n number of the Y-directional wires 603 to separate them electrically (m and n are all positive integer).

The X-directional wire 602 and the Y-directional wire 603 are all drawn out as external terminals, respectively.

A pair of electrodes (not shown) composing the electron emitting device 604 of the present invention is electrically connected through the wire connections 605 to m number of the X-directional wires 602 and n number of the Y-directional wires 603.

A scanning signal applying means, not shown, for applying scanning signals is connected to the X-directional wire 602 in order to select a row of the electron emitting device 604 of the present invention arranged to X direction. On the other hand, a modulated signal generating means, not shown, for modulating each column of the electron emitting device 604 of the present invention, depending on an input signal, arranged to Y direction is electrically connected so as to select individual device to be independently operated.

Such an image forming apparatus composed using the electron source in a simple matrix arrangement is described with reference to FIG. 6. FIG. 6 shows a display panel of the image forming apparatus.

Figure 6:
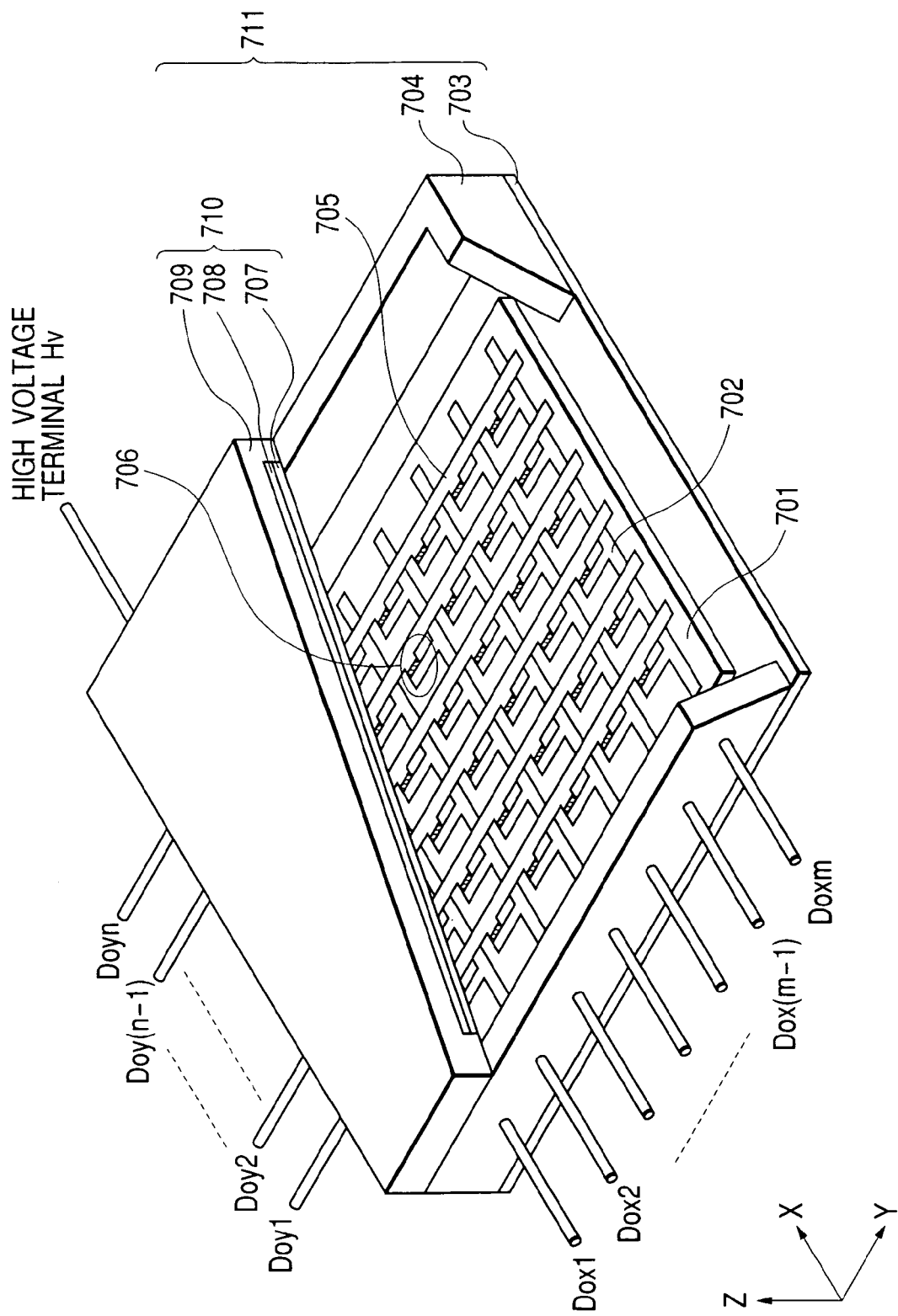
FIG. 6 shows an example of an image forming panel using the electron source of the present invention.

In FIG. 6, 701 denotes an electron source substrate in which a plurality of electron emitting devices are arranged, 703 denotes a rear plate to which the electron source substrate 701 is fixed, and 710 denotes a face plate in which a fluorescent film 708 and a metal back 707 are formed on inside of a glass substrate 709. 704 is a support frame, which is connected to the rear plate 703 and the face plate 710. 711 denotes an envelope, which is sealed.

706 denotes the electron emitting device of the present invention. 702 and 705 denote X-directional wire and Y-directional wire connected to the electron emitting device of the present invention.

The envelope 711 includes the face plate 710, the support frame 704 and the rear plate 703, as described above. On the other hand, the envelope 711 has strength sufficient against atmosphere pressure by installing supports (not shown) called as spacer to the face plate 710 and the rear plate 703.

The configuration of the image forming apparatus described above is just an example of image forming apparatus applicable to the present invention, and can be modulated depending on technical aspects of the present invention. As for an input signal, TV signal (for example, high qualified TV including MUSE manner) as well as NTSC manner, PAL, SECAM manner and so on can by adopted.

In addition, the carbon fiber obtained in the present invention can be preferably applied to body for storing a material (ex. hydrogen), cathode material of batteries and complex materials as well as the electron emitting device. Particularly, in case the carbon fiber of the present invention is graphite nanofiber, since graphene having excellent crystallization to an axial direction of fiber is accumulated, more superior hydrogen occlusion (in other words "adsorption" or "storage") is come out, and better characteristics can be obtained as a cathode material of batteries. Among batteries, the graphite nanofiber of the present invention is preferably applied to cathode of a secondary battery (rechargeable battery), and in particular the graphite nanofiber of the present invention having excellent crystal structure is preferably applied to cathode of a lithium ion secondary battery. Since the graphite nanofiber of the present invention has excellent crystal structure, this may form stable and large charging/discharging capacity. And when the graphite nanofibers formed using the catalytic particle mainly containing at least one of a Fe—Pd alloy, a Ni—Pd alloy and the Co—Pd alloy are applied to a body for storing hydrogen or secondary battery, the especially excellent characteristic can be shown.

EXAMPLES

Hereinafter, examples of the present invention are described in detail.

Example 1

In the first Example, Pd and Co are added as catalyzing particles by the common sputtering manner.

Now, a method of making electron emitting device of the present example is described in detail with reference to FIGS. 1A to 1E.

(Step 1)

After cleaning the substrate 101 sufficiently with the quartz substrate, Ti with thickness of 5 nm and Pt with thickness of 100 nm, not shown, are continuously evaporated on overall substrate by sputtering at an initial stage in order to form the gate electrode 102 and the cathode (emitter) electrode 103.

Then, the resist pattern is formed using a not-shown positive type photoresist in the photolithography process.

Then, the patterned photoresist as mask is dry-etched by using Ar gas on the Pt layer and Ti layer, and the gate electrode 102 and the cathode 103 having an electrode gap (width of interval) of 5 μm is patterned (FIG. 1A).

(Step 2)

The resist pattern 104 is formed using negative type photoresist used for afterward lift-off of an upper layer in the photolithography process (FIG. 1B).

Then, TiN layer is formed as a conductive material layer on which carbon fiber 107 will be grown with the catalytic particles 106.

In addition, the catalytic particles 106 of the present invention are all formed by common sputtering manner. In this case, some Co thin peaces are putted on a Pd sputtering target. The catalytic particles 106 include Pd and Co of 33 atm % in a ratio (atomic ratio) to Pd (FIG. 1C).

(Step 3)

The resist and the conductive material layer 105 and the catalytic particle 106 on the resist are lifted off by using separation liquid of the resist patterned in the process 2, and the conductive material layer 105 and the catalytic particle 106 are patterned as desired (FIG. 1D).

(Step 4)

Then, they are heated in ethylene gas flow. After investigation with a scanning electronic microscope, it is found that a plurality of carbon fibers are formed. (FIG. 1E) Moreover, the carbon fibers were graphite nanofibers.

The electron emitting device made as above are mounted in a vacuum device as shown in FIG. 3, and gas is exhausted by the vacuum exhausting device 409 until reaching to $2 \times 10^{-5}$ Pa. Positive voltage $V_a$=10 kV is applied to the anode 411 H=2 mm spaced apart from the device as shown in FIG. 3. At this time, device current $I_f$ and electron emission current $I_e$ flowing by applying pulse voltage having driving voltage $V_f$ are measured at the device.

$I_f$ and $I_e$ characteristics of the device are shown in FIG. 4. In other words, $I_e$ is abruptly increased at about half of the applied voltage, and about 1 μA of the electron emission current $I_e$ is measured when $V_f$ is 15V. On the other hand, though $I_f$ has similar characteristics to $I_e$, but its value is low more than one order, compared with $I_e$.

Example 2

In the second embodiment, Pd and Fe are added as catalytic particles by common co-evaporation method.

In the present embodiment, after making the electron emitting device in a similar manner to the first embodiment, except that the second process is conducted as below, $I_f$ and $I_e$ are measured.

(Step 2)

The resist pattern 104 is formed using negative type photoresist used for lift-off of an upper layer in the photolithography process (FIG. 1B).

Then, TiN layer is formed as a conductive material layer 105 on which the carbon fiber 107 would be grown with the medium of the catalytic particles 106.

And, the catalytic particles 106 of the present invention are formed by a common electron beam (two materials simultaneously) evaporation manner as follows. Then, the catalytic particles are deposited on TiN layer by using Pd and Fe as vacuum evaporation sources. As a result, the catalytic particles 106 containing Fe component of 20 atm % to Pd is formed in an island shape (FIG. 1C).

$I_f$ and $I_c$ characteristics of the device are identical to those of FIG. 4. In other words, $I_e$ is abruptly increased at about half of the applied voltage, and about 1 μA of the electron emission current $I_c$ is measured when $V_f$ is 15V. On the other hand, though $I_f$ has similar characteristics to $I_e$, but its value is low more than one order, compared with $I_c$. Moreover, the carbon fiber formed in this example was a graphite nano fiber.

Example 3

In the third embodiment, Pd and Ni are added as catalytic particles by liquid coating.

In the present embodiment, after making the electron emitting element in a similar manner to the first embodiment, except that the second process is conducted as below, $I_f$ and $I_e$ are measured.

(Step 2)

The resist pattern 104 is formed using negative type photoresist used for lift-off of an upper layer in the photolithography process (FIG. 1B).

Then, TiN layer is formed as a conductive material layer 105 on which the carbon fiber 107 would be grown with the medium of the catalytic particles 106.

And, the catalytic particles 106 of the present invention are formed by liquid coating as follows. By using mixed solution of acetic acid complex of Pd and Ni, the mixed liquid is spinner-coated. After coating, it is heated at the atmosphere. As a result, the catalytic particles 106 containing Ni component of 25 atm % to Pd is formed in an island shape (FIG. 1C).

$I_f$ and $I_e$ characteristics of the element are identical to those of FIG. 4. In other words, $I_e$ is abruptly increased at about half of the applied voltage, and about 1 µm of the electron emission current $I_e$ is measured when $V_f$ is 15V. On the other hand, though $I_f$ has similar characteristics to $I_e$, but its value is low more than one order, compared with $I_e$. Moreover, the carbon fiber formed in this example was a graphite nano fiber.

Example 4

In this embodiment, the electron emitting device shown in FIGS. 1 and 2 is used, like the first embodiment. And, in this embodiment, the cathode 203(103) is coated with TiN (titan nitride) with thickness of 300 nm by using the ion beam sputtering manner. The conductive material layer 105 used in the first embodiment is not used.

And, a catalytic layer made of Pd—Co alloy is evaporated on the cathode as much as amount to be an island shape by the sputtering manner using Ar (argon) gas. As a result of analysis of the evaporated catalytic layer, it is found that 50 atm % of Co is included in Pd. After that, the catalytic particles 106 with particle diameter of about 50 nm are obtained though heating under hydrogen circumstance.

Then, in this embodiment, the substrate is heated at 500° C. for 10 minutes among gas flow after mixing 1% of hydrogen diluted by nitrogen and 0.1% of acetylene diluted by nitrogen in 1:1 ratio at atmosphere pressure (about $1 \times 10^5$ Pa).

As a result of observing that with the scanning electronic microscope, it is found that a plurality of carbon fibers, curved and elongated in a fiber shape with diameter of about 50 nm, are formed in a region where Pd—Co particles are formed. At this time, the layer composed of a plurality of carbon fibers has thickness of about 5 µm. In addition, as a result of observing this material with the transmission electronic microscope, the image as shown in FIG. 8 is obtained. In FIG. 8, a shape of carbon fiber seen at an optical microscope level (~1000 times) are schematically shown to left, a shape at an scanning electron microscope (SEM) level (~30,000 times) to center, and a shape at a transmission electron microscope (TEM) level (~1,000,000 times) to right.

And, an interlayer spacing d(002) is inferred to be 0.35 to 0.37 nm. In addition, in the center of fiber axis, there exist an element in which the graphene layer is omitted and an element which is not distinct (it is certainly filled with carbon in amorphous shape).

As a result of measuring electron emission characteristic (voltage-current characteristic) of this device, the characteristics shown in FIG. 4 are obtained and the threshold electric field required for electron emission is 3V/µm.

Example 5

In this embodiment, the electron emitting device shown in FIGS. 1 and 2 is used, like the first embodiment. And, in this embodiment, the cathode 203(103) is coated with Cr (chrome) with thickness of 300 nm by using the ion beam sputtering manner.

And, in this embodiment, titan (Ti) is sputter-evaporated as a conductive material layer 105(205) to have thickness of 5 nm. And, Pd (Co 25 atm %) to be the catalytic layer is sputter-evaporated to have an island shape with thickness less than 5 nm. After that, the catalytic particles 106 are formed by heat treatment under hydrogen circumstance.

And, in this embodiment, after putting the substrate into a furnace and then exhausting gas in the furnace sufficiently, gas in which 1 vol % of hydrogen is diluted by nitrogen and 1% of ethylene diluted by nitrogen are put into the furnace in approximately 1:1 ratio up to pressure of 400 Pa.

Then, in this embodiment, as a result of heating the furnace up to 600° C. and then maintaining the temperature for 30 minutes, carbon fibers having a film shape are grown on the cathode. As a result of observing this carbon fibers with the transmission electronic microscope, the configuration shown in FIG. 16 is checked.

As a result of measuring electron emission characteristic (voltage-current characteristic) of this device, the characteristics shown in FIG. 4 are obtained and the threshold electric field required for electron emission is 5V/µm.

Example 6

After sufficiently cleaning the quartz substrate 1, TiN is coated to have thickness of 300 nm as the cathode by using the ion beam sputtering manner.

Then, the layer in which catalytic particles composed of Pd—Co alloy are dispersed and arranged by the sputtering manner using Ar gas are evaporated on the cathode with size of 1 mm². After that, heat treatment under hydrogen circumstance forms a plurality of catalytic particles composed of Pd—Co alloy with particle diameter of about 30 nm.

The formed catalytic particles are composed of alloy in which 50 atm % of Co is contained in Pd, as a result of analysis.

Then, the substrate is heat-treated at 600° C. for 10 minutes at about atmosphere pressure (about $1 \times 10^5$ Pa) through flow of gas (gas in which 1 vol % of hydrogen is mixed with nitrogen and gas in which 1 vol % of ethylene is mixed with nitrogen are mixed in 1:1 ratio).

As a result of observing a surface of the cathode with the scanning electronic microscope, it is found that a plurality of graphite nanofibers 107(207), curved with diameter of 30~50 nm and grown in a fiber shape, are formed on the cathode. At this time, the layer composed of a plurality of graphite nanofibers has thickness of about 5 µm.

And, an interlayer spacing d(002) is measured to be 0.35 nm.

In addition, in the center of the fiber, there exist an element in which the graphene layer is omitted and an element which is not distinct.

Figure 10:
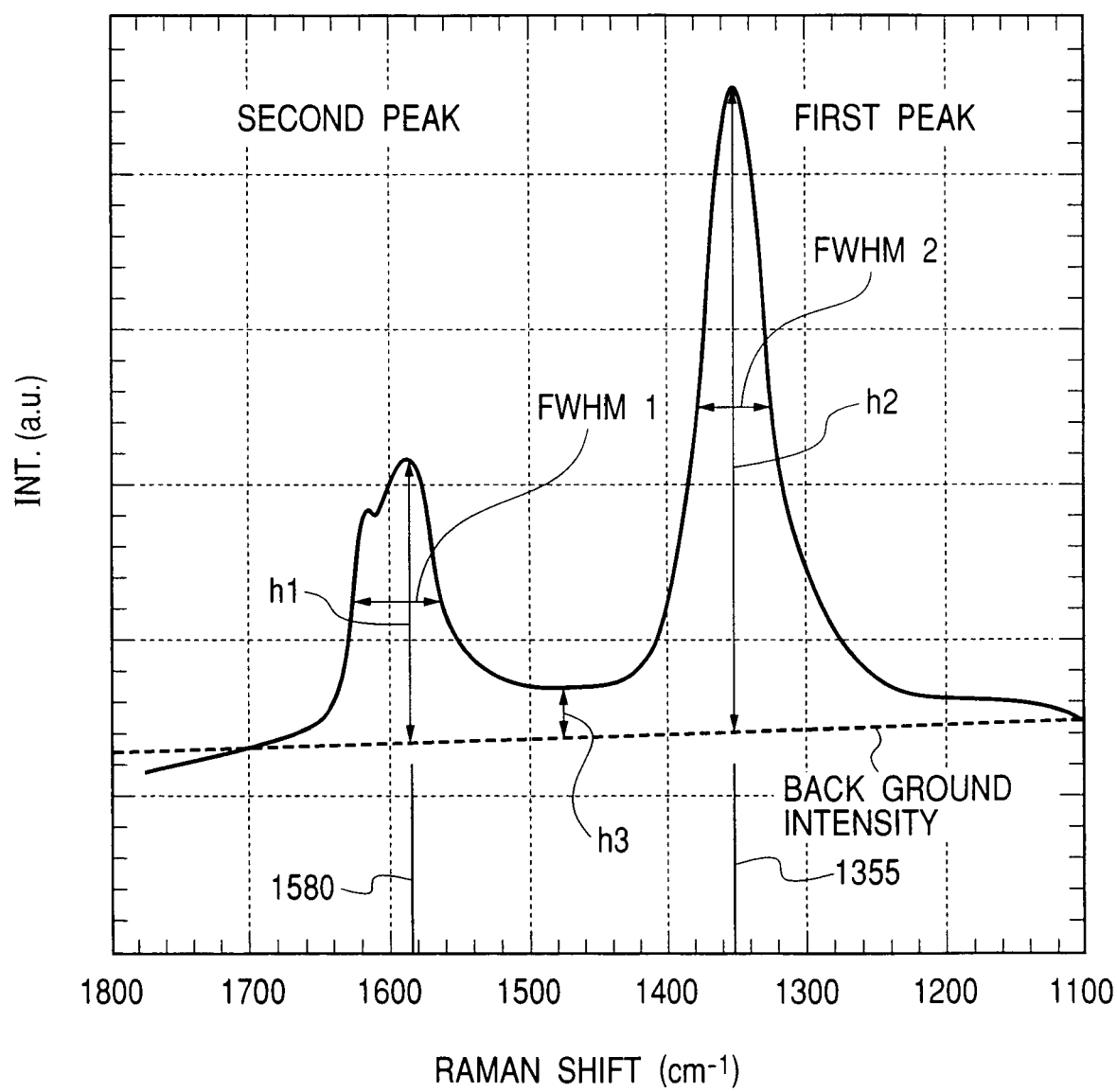
FIG. 10 is a graph showing Raman Spectra of the electron emitting element of the present invention.

As a result of measuring Raman spectrum characteristic by irradiating laser rays with wavelength of 514.5 nm on the graphite nanofibers, the result is as shown in FIG. 10.

From this result, it is found that FWHM 1 is 68 kaiser (cm⁻¹), FWHM 2 is 55 kaiser (cm⁻¹) and h2/h1 is 2.2.

On the other hand, when being replaced with the catalyst containing 100% of Pd without adding Co and the catalyst containing 23 atm % of Co added to Pd, the film containing a plurality of carbon fibers is formed using each catalytic particle, identically to this embodiment.

Figure 12:
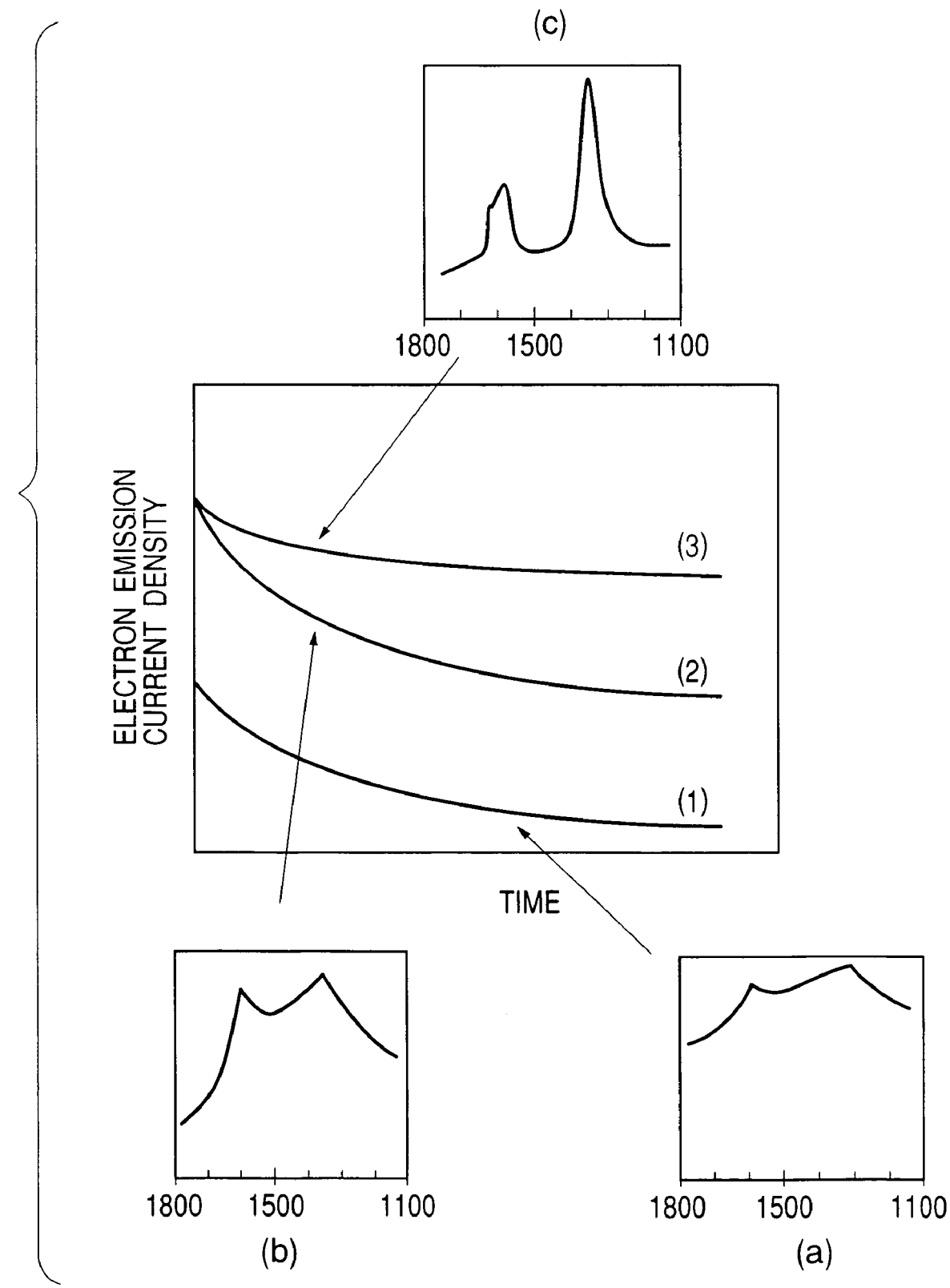
FIG. 12 is a graph showing Raman Spectra and aging of the electron emitting element of the present invention.
Figure 13:
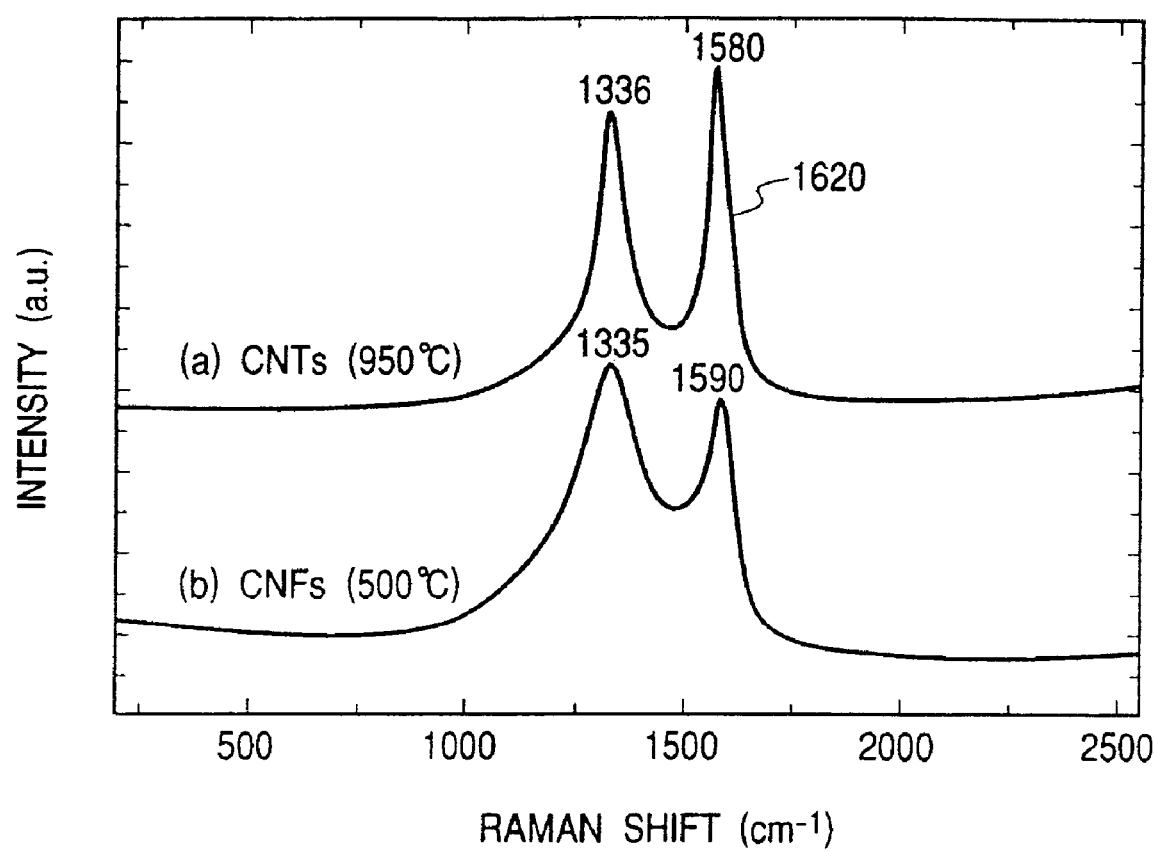
FIG. 13 is a graph showing Raman Spectra of conventional carbon fiber.

And, the electron emission characteristics of the film formed using the catalyst containing 50 atm % of Co added to Pd prepared in this embodiment, the film formed using the catalyst containing 100% of Pd and the film formed using the catalyst containing 23 atm % of Co added to Pd are compared. Their comparison results are schematically shown in FIG. 12.

FIG. 12A shows results of Raman spectrum measurement obtained by irradiating laser with wavelength of 514.5 nm on the carbon fiber formed using the catalyst containing 100% of Pd without adding Co.

Likewise, FIG. 12B shows results of Raman spectrum measurement obtained by irradiating laser with wavelength of 514.5 nm on the carbon fiber formed using the catalyst containing 23 atm % of Co added to Pd.

And, FIG. 12C shows results of Raman spectrum measurement obtained by irradiating laser with wavelength of 514.5 nm on the graphite nanofiber formed using the catalyst containing 50 atm % of Co added to Pd, prepared in this embodiment.

As shown in FIG. 14, a substrate 1 on which a film 4 containing a plurality of carbon fibers arranged on the cathode 3 prepared in this embodiment is positioned in a vacuum chamber 9. In FIG. 14, 1 denotes the substrate, 3 denotes the cathode, 4 denotes the film containing a plurality of carbon fibers, 61 denotes an anode substrate, 62 denotes a transparent anode using ITO, 5 denotes an insulating spacer, 6 denotes an ammeter, 7 denotes a high voltage power source, 8 denotes a vacuum pump and 9 denotes the vacuum chamber. A glass substrate 61 to which a transparent electrode is attached through the insulating spacer 5 is installed. The high voltage power source 7 and the ammeter 6 are respectively connected thereto, and inner pressure of the vacuum chamber 9 is set to $1 \times 10^9$ Pa of vacuum level by using the vacuum pump 8.

And, high voltage $V_a$ is applied to the anode 62, and then electron emission amount emitted from the each film containing carbon fibers formed with different content of Co to Pd is measured by the ammeter 6. And at the same time, time dependence (life characteristic) of electron emission characteristics of the each film containing carbon fibers is measured.

At this time, it is assumed that three kinds of films corresponding to FIGS. 12A to 12C have same thickness.

In addition, in the present invention, current density when electron emission current does not increase in exponential relation though voltage increases in view of V-I characteristic when voltage of the anode is increased slowly is defined as a maximum current density of the each film.

And, in the first place, the maximum current density is measured for the each film, and set to as an initial value of the maximum current density. And, change of current density to time when voltage achieving the initial value of the maximum current density is continuously applied to the each film is measured.

Results of investigation for change of life by measuring current density change of each film are indicated by (1) to (3) in FIG. 12, each of which corresponds to (a) to (c) of FIG. 12 respectively.

In the graphite nanofiber film ((3) in FIG. 12) of this embodiment, the current at a maximum current density is 80 mA/cm$^2$ and falloff of the current is maintained at an approximately constant value. However, in the carbon fiber film ((2) in FIG. 12) in which only 23 atm % of Co is added to Pd, though an initial value of current density is equal to that of the graphite nanofiber film ((3) in FIG. 12) of this embodiment, the electron emission characteristic is rapidly decreased. In addition, in the carbon fiber film ((1) in FIG. 12) in which no Co is added to Pd, an initial value of current density is less than the case of this embodiment and the electron emission characteristic is also rapidly decreased.

And, in the measurement system shown in FIG. 14, density of the electron emission site is 10$^3$/cm$^2$ or more when an electric field of $1 \times 10^5$ V/cm is applied to the film (Co: 50 atm %) prepared in the present embodiment. In addition, 10$^3$/cm$^2$ or more of graphite nanofibers are arranged in the film (Co: 50 atm %) prepared in this embodiment.

In addition, since a definite peak is not observed in the film containing carbon fibers shown in (a) of FIG. 12, it is difficult to define height of peak (Raman scattering intensity) and FWHM.

In the film containing carbon fibers shown in (b) of FIG. 12, definite peaks are observed near 1355 kaiser (cm$^{-1}$) and near 1580 kaiser. However, the FWHM is wider in the portion shown near 1355 kaiser than that shown near 1580 kaiser.

In the film containing graphite nanofibers prepared in this embodiment shown in (c) of FIG. 12, Raman spectra has a first peak in a range of 1355±10 kaiser and a second peak in a range of 1580±10 kaiser. And, the FWHM of the peak shown in 1355±10 kaiser is narrower than that shown in 1580±10 kaiser. In addition, the height of peak shown in 1355±10 kaiser (relative intensity which is difference between background intensity and Raman scattering intensity of peak shown in 1355±10 kaiser) is about double of the height shown in 1580±10 kaiser (relative intensity which is difference between background intensity and Raman scattering intensity of peak shown in 1580±10 kaiser).

And, in the film containing graphite nanofibers prepared in this embodiment shown in (c) of FIG. 12, it is found in Raman spectra that relative intensity h3, which is difference between background intensity and minimum intensity of Raman scattering intensity between the first peak and the second peak (or between D band and G band), is 1/10 or lower of relative intensity h2, which is difference between background intensity and Raman scattering intensity of the first peak.

From these results, it is found that deterioration of the electron emission characteristics closely related to the FWHM of each peak and the peak height in Raman spectra.

Therefore, after measuring life characteristic of the films containing a plurality of carbon fibers in various types by changing element added to Pd, growth hours and concentration of gas, preferably applied in the present invention, there is caused improvement of initial electron emitting current density in Raman spectrum characteristic in the fact that the relative intensity h2, which is difference between background intensity and Raman scattering intensity of the first peak, is 1.3 times or more of the relative intensity h1, which is a difference between Raman scattering intensity of the second peak and background intensity.

And, in the fact that the relative intensity h2, which is difference between background intensity and Raman scattering intensity of the first peak, is 1.3 times or more and 2.5 times or lower of the relative intensity h1, which is a difference between Raman scattering intensity of the second peak and background intensity, improvement of initial current density and life is obtained.

In addition, the film containing a plurality of carbon fiber of the present invention may obtain improvement of initial current density and life when the Full-Width Half-Maximum of the first peak (FWHM2) and the Full-Width Half-Maximum of the second peak (FWHM1) satisfy the condition that FWHM2/FWHM1≦1.2.

And preferably in the film containing a plurality of carbon fibers of the present invention, the Full-Width Half-Maximum of the first peak (FWHM2) and the Full-Width Half-Maximum of the second peak (FWHM1) are in relation that FWHM2/FWHM1≦1.2, and the relative intensity h2, which is difference between background intensity and Raman scattering intensity of the first peak, is 1.3 times or more of the relative intensity h1, which is a difference between Raman scattering intensity of the second peak and background intensity. And more preferably, the film containing a plurality of carbon fibers of the present invention may obtain improvement of initial current density and life when the Full-Width Half-Maximum of the first peak (FWHM2) and the Full-Width Half-Maximum of the second peak (FWHM1) are in relation that FWHM2/FWHM1≦1.2, and the relative intensity h2, which is difference between background intensity and Raman scattering intensity of the first peak, is 1.3 times or more and 2.5 times or lower of the relative intensity h1, which is a difference between Raman scattering intensity of the second peak and background intensity.

And further preferably, the film containing a plurality of carbon fibers of the present invention may obtain stable electron emission current density when relative intensity h3, which is difference between background intensity and minimum intensity of Raman scattering intensity between the first peak and the second peak (or between D band and G band), is $\frac{1}{10}$ or lower of relative intensity h2, which is difference between background intensity and Raman scattering intensity of the first peak in addition to each of above characteristics (relation of FWHM of the first peak and the second peak and/or relation of intensity ratio of the first peak and the second peak). And, it is possible to obtain high electron emission current density stably for a long time when the relative intensity h3 is $\frac{1}{15}$ or lower of the relative intensity h2.

And, the film containing a plurality of carbon fiber may obtain stable and high electron emission current density for a long time by restrain decrease of high initial electron emission current density when FWHM1 and FWHM2 have a relation that FWHM2/FWHM1≦1.2, h2 is 1.3 times or more and 2.5 times or lower of h1, and h3 is $\frac{1}{15}$ or more of h2.

After evaluating the graphite nanofiber of the present invention shown in (c) of FIG. 12 and the carbon fiber shown in (a) and (b) of FIG. 12 in view of hydrogen storing and cathode material of lithium ion battery, the graphite nanofiber shown in FIG. 12C of the present invention has more excellent hydrogen storing than the carbon fiber shown in FIGS. 12A and 12B. The carbon fiber shown in FIG. 12B of more excellent hydrogen storing than the carbon fiber shown in FIG. 12A.

And, when absorption and desorption of hydrogen are repeated, the graphite nanofiber shown in (C) of FIG. 12 of the present invention shows more stable absorption and desorption characteristics than the carbon fiber shown in (a) and (b) of FIG. 12. And the absorption and desorption characteristics of the carbon fibers shown in (b) of FIG. 12 is more stable than the carbon fibers shown in (b) of FIG. 12.

In addition, a carbon electrode (cathode) is made using a plurality of graphite nanofibers shown in (c) of FIG. 12 of the present invention, and a carbon electrode (cathode) is made using a plurality of carbon fiber shown in (a) and (b) of FIG. 12. And, charging capacity and discharging capacity of each cathode are measured with a common test battery. As a result, the carbon electrode (cathode) using a plurality of graphite nanofiber shown in (c) of FIG. 12 of the present invention shows particularly superior characteristics. And the carbon electrode (cathode) using a plurality of carbon fiber shown in FIG. 12B shows superior charging/discharging capacity than that of using a plurality of carbon fiber shown in FIG. 12C.

And, after repeating such charging and discharging, the carbon electrode (cathode) using a plurality of graphite nanofiber shown in (c) of FIG. 12 of the present invention shows significantly stable charging/discharging characteristic and rapid charging characteristic at the same time. And the carbon electrode (cathode) using a plurality of carbon fiber shown in FIG. 12B shows superior stability of charging/discharging capacity than that of using a plurality of carbon fiber shown in FIG. 12C.

The cathode made in this embodiment is used as a cathode of a lithium ion secondary battery for measurement. At this time, lithium transitional metal oxide is used as anode active material for the anode.

In order to make the cathode with graphite nanofibers of the present invention, a plurality of the graphite nanofibers of the present invention may be made into a pellet shape by using such as binder.

The cathode using the graphite nanofiber of the present invention may be preferably applied to the lithium ion secondary battery as a secondary battery (rechargeable battery). In addition, as a cathode material, a transitional metal is preferably included. And, as electrolytic solution, any one which is commonly used for the lithium ion secondary battery will do.

Example 7

This Example is different from the above embodiment in fact of Pd (70 atm % of Ni is added) is used for the catalyst instead of the catalyst of the Example 6 and in fact of carbon fiber forming method.

In order to form carbon fiber, a substrate having the catalytic particles arranged on the cathode made of TiN is put into a furnace, and then after exhausting gas in the furnace sufficiently, gas in which 1 vol % of hydrogen is mixed with helium (He) and gas in which 1 vol % of ethylene is mixed with helium are put in the furnace at near 1:1 ratio to have inner pressure of 400 Pa.

Then, the above furnace is heated to 600° C. and maintained at the temperature for 30 minutes so that same graphite nanofiber as in the 6th embodiment is grown.

After measuring Raman spectrum characteristic by irradiating laser of 514.5 nm to this graphite nanofibers as well as in the Example 6, the results as shown in FIG. 11 are obtained.

From those results, FWHM1 is 70 kaiser (cm$^{-1}$), FWHM2 is 55 kaiser and h2/h1 is 1.8, all of which satisfy relation of FWHM and intensity ratio of Raman scattering.

Then, identically to the Example 6, time dependency (life characteristic) of electron emission amount emitted from the film containing the graphite nanofibers of this embodiment is measured.

As a result, though emission current at the maximum current density is higher than that of the device (film) of the Example 6 ((3) of FIG. 12), decrease of emission current density takes more time for going to a constant value, compared with the device of the Example 6 ((3) of FIG. 12). However, it obtains characteristics superior to the devices of (2) of FIG. 12 or (1) of FIG. 12 in the Example 6, and close to the device of the Example 6.

And, in the film containing a plurality of graphite nanofibers prepared in this Example also, density of the electron emission site is more than $10^3/cm^2$ when an electric field of $1\times10^5$V/cm is applied, according to the measurement system shown in FIG. 14 by using same measuring method as the Example 6. In addition, $10^3/cm^2$ of graphite nanofibers are arranged in the film prepared in this Example.

Example 8

This Example is different from the Example 6 in fact that Ni—Pd is used as an element composing catalyst and in fact of carbon fiber forming method.

First of all, Pd—Ni catalyst is made by putting several scales (about 2 cm square) containing 100% of Pd upon a sputtering target made of 100% of Ni of a sputter-evaporating device and then sputtering them at the same time, and about 4 nm of film made of Pd—Ni is evaporated on TiN cathode. And, by adjusting ratio of Pd scales put on Ni, there are prepared films respectively containing 20 atm % of Ni, 50 atm % of Ni and 80 atm % of Ni to Pd.

In addition, there is separately prepared a substrate in which Pd film with a thickness of 4 nm is evaporated on TiN cathode by preparing only a sputtering target having 100% of Pd.

Then, Pd 100%, Pd—Ni (20 atm %), Pd—Ni (50 atm %), Pd—Ni (80 atm %) and Ni 100% substrates formed as above are put into an infrared furnace (IR furnace), and hydrogen (2%) diluted by inert gas and ethylene ($C_2H_4$, 2%) diluted by inert gas are flowed in at 1:1 ratio, then the furnace maintained at 580° C. for about 5 minutes and then cooled.

5 kinds of substrates are respectively cut and photographed by SEM, and a thickness of the film containing a plurality of carbon fibers is measured. In addition, for the film containing a plurality of carbon fibers formed on each substrate, Raman spectrum characteristic (Raman spectrum) detected by irradiating laser with a wavelength of 514.5 nm is measured as well as the embodiment 6. Each value of FWHM1, FWHM2, h1, h2, h3 and film thickness at this time is subscribed in the following Table 1.

TABLE 1

| atm % | h1 relative value | h2 relative value | h3 relative value | FWHM1 kaiser | FWHM2 kaiser | film thickness μm |
|---|---|---|---|---|---|---|
| Pd 100% | 52 | 46 | 39 | >150 | >200 | ~3 |
| Pd—Ni 20% | 52 | 44 | 22 | 94 | 208 | ~3 |
| Pd—Ni 50% | 52 | 66 | 12 | 60 | 75 | ~1 |
| Pd—Ni 80% | 52 | 60 | 17 | 65 | 78 | ~1 |
| Ni 100% | 52 | 45 | 17 | 70 | 80 | very thin |

As seen in Table 1, though carbon fiber grows in this conditions when Pd is 100%, it is surmised from the FWHM of Raman peak (measured from a curve fitting to Lorenz curve) caused by graphite configuration that the carbon fiber formed with Pd100% having less structural order than that of the other carbon fibers.

Carbon fiber is checked to grow when Ni is added to Pd in range of 20 atm % to 100 atm %. However, very small number of carbon fiber is grown when Ni is 100%, and its length is also less than several hundred nm. In addition, it is recognized that the FWHM (FWHM1 and FWHM2) are significantly decreased by adding Ni.

And then, time dependence (life characteristic) of electron emission amount emitted from the film containing the graphite nanofibers of this Example in the same condition as the Example 6 is measured.

As a result, all of devices (films) comprising a plurality of carbon fibers formed using the catalytic particles of Pd—Ni alloy show electron emission characteristic near (2) of FIG. 12 shown in the Example 6. And, the catalytic particles having 100% of Ni shows low growth of carbon fiber, and very low electron emission current, compared with other devices. On the other hand, the device comprising a plurality of carbon fibers formed using the catalytic particles having 100% of Pd shows electron emission characteristic substantially equal to (1) of FIG. 12 shown in the sixth embodiment. From those results, it is determined that an effective range of Ni addition is 20 atm % to 80 atm %.

Example 9

A result that Co is added to Pd in same manner as the eighth embodiment is shown in Table 2. Method of making catalyst and growth condition of carbon fiber are identical to the Example 8.

TABLE 2

| Atm % | h1 relative value | h2 relative value | h3 relative value | FWHM1 kaiser | FWHM2 kaiser | film thickness μm |
|---|---|---|---|---|---|---|
| Pd—Co 20% | 52 | 38 | 12 | 119 | 196 | ~3 |
| Pd—Co 50% | 52 | 47 | 7 | 50 | 112 | ~1 |
| Pd—Co 80% | 52 | 49 | 7 | 45 | 90 | ~1 |

And, in a test piece having 100% of Co, growth is not checked at the 580° C. (growth temperature). In addition, it is found that the FWHM s (FWHM1 and FWHM2) are significantly decreased when Co is added 20 atm % or more.

Then, time dependence (life characteristic) of electron emission amount emitted from the carbon fiber of this Example in the same condition as the Example 6 is measured.

As a result, all of devices comprising a plurality of carbon fibers formed using the catalytic particles of Pd—Co alloy show electron emission characteristic near (2) of FIG. 12 shown in the Example 6, but worse than the electron emitting device prepared in the Example 6 (the characteristic is shown in (3) of FIG. 12. And, the catalytic particles having 100% of Co shows low growth of carbon fiber and low electron emission characteristic. On the other hand, the device using a plurality of carbon fibers formed using the catalytic particles having 100% of Pd shows electron emission characteristic equal to (1) of FIG. 12 shown in the Example 6. From those results, it is determined that an effective range of Co addition is 20 atm % to 80 atm %.

Example 10

In this Example, growth temperature of carbon fiber in the Example 8 is changed from 580° C. to 630° C. Others are identical to the Example 8. Its results are shown in Table 3.

TABLE 3

| atm % | h1 relative value | h2 relative value | h3 relative value | FWHM1 kaiser | FWHM2 kaiser |
|---|---|---|---|---|---|
| Pd—Ni 20% | 52 | 79 | 12 | 63 | 73 |
| Pd—Ni 50% | 52 | 112 | 7 | 59 | 52 |
| Pd—Ni 80% | 52 | 89 | 7 | 56 | 59 |
| Ni 100% | 52 | 50 | 7 | 50 | 55 |

And, growth in a test piece having 100% of Ni is better than that of the Example 9, but the growth of carbon fiber is very slow, compared with the case that particles of Pd—Ni alloy are used. In addition, it is found that the FWHM s (FWHM1 and FWHM2) are significantly decreased when Ni is added 20 atm % or more.

Then, time dependence (life characteristic) of electron emitting amount emitted from the carbon fiber of this Example in the same condition as the Example 6 is measured.

As a result, it is possible that all of devices (films) comprising a plurality of carbon fibers formed using the catalytic particles of Pd—Ni alloy show electron emission characteristic near (2) of FIG. 12 shown in the Example 6. And, the catalytic particles having 100% of Ni shows low initial electron emission current density rather than one using catalytic particles of Pd—Ni alloy. On the other hand, the device (film)

comprising a plurality of carbon fibers formed using the catalytic particles having 100% of Pd shows electron emission characteristic equal to (1) of FIG. 12 shown in the Example 6. From those results, it is determined that an effective range of Ni addition is 20 atm % to 80 atm %.

Example 11

In this example, growth temperature of carbon fiber in the example 9 is changed from 580° C. to 630° C. Others are identical to the ninth embodiment. Its results are shown in Table 4.

TABLE 4

| atm % | h1 relative value | h2 relative value | h3 relative value | FWHM1 Kaiser | FWHM2 Kaiser |
|---|---|---|---|---|---|
| Pd—Co 20% | 52 | 79 | 12 | 60 | 73 |
| Pd—Co 50% | 52 | 110 | 7 | 49 | 57 |
| Pd—Co 80% | 52 | 105 | 7 | 49 | 50 |

And, though growth of a test piece having 100% of Co is not checked at this growth temperature, growth of carbon fiber is very slow, compared with the case that particles of Pd—Co alloy are used. In addition, it is found that the FWHM s (FWHM1 and FWHM2) are significantly decreased when Co is added in range of 20 atm % or more.

Then, time dependence (life characteristic) of electron emission amount emitted from the film containing the carbon fibers of this example is measured in the same condition as the Example 6.

As a result, it is possible that all of devices comprising a plurality of carbon fibers formed using the catalytic particles of Pd—Co alloy show electron emission characteristic near (3) of FIG. 12 shown in the Example 6. And, the catalytic particles having 100% of Co shows lower initial electron emission current density than one using catalytic particles of Pd—Co alloy. On the other hand, the device (film) comprising a plurality of carbon fibers formed using the catalytic particles having 100% of Pd shows electron emission characteristic substantially equal to (1) of FIG. 12 shown in the Example 6. From those results, it is determined that an effective range of Co addition is 20 atm % to 80 atm %.

Example 12

A result that Fe is added to Pd in same manner as the Example 8 is shown in Table 5. Method of making catalyst and growth condition of carbon fiber are identical to the Example 9.

TABLE 5

| atm % | h1 relative value | h2 relative value | h3 relative value | FWHM1 kaiser | FWHM2 kaiser | film thickness μm |
|---|---|---|---|---|---|---|
| Pd—Fe 20% | 52 | 34 | 46 | >120 | >200 | ~3 |
| Pd—Fe 50% | 52 | 27 | 49 | 117 | 192 | ~1 |
| Pd—Fe 80% | 52 | 21 | 52 | 95 | 144 | ~1 |

And, in a test piece having 100% of Fe, growth is not checked at this growth temperature. In addition, it is found that the FWHM s (FWHM1 and FWHM2) are significantly decreased when Fe is added in range of 20 atm % or more.

Then, time dependence (life characteristic) of electron emission amount emitted from the film comprising the carbon fibers of Example in the same condition as the Example 6 is measured.

As a result, all of devices (films) comprising a plurality of carbon fibers formed using the catalytic particles of Pd—Fe alloy show electron emission characteristic near (2) of FIG. 12 shown in the Example 6, but worse than the electron emitting element ((3) in FIG. 12) prepared in the Example 8. From those results, it is determined that an effective range of Fe addition is 20 atm % to 80 atm %.

Example 12

In this Example, a plurality of electron emitting devices having a shape shown in FIG. 2 are prepared using the film containing a plurality of carbon fibers (graphite nanofibers) prepared in the Example 6 (as shown in (c) of FIG. 12), and these are arranged in matrix as shown in FIG. 5 to make the image display device shown in FIG. 6. At this time, a gap between the face plate 710 and the electron source substrate 701 is set to be 2 mm. As a result of applying 10 kV to the anode 707 of this image display device to display TV image, it is possible to obtain stable image with high brightness for a long time.

(Effects of the Present Invention)

As described above, the catalyst of the present invention enables to provide carbon fiber applicable to an electron emitting element, which excellently grows at a relatively low temperature without needing complex process for stable growth of the carbon fiber at a low temperature. And, since it can be made at a low temperature, the catalyst of the present invention is preferred in aspect of effect on other members and manufacturing costs. In addition, there is no need of explosion-proof equipments for the manufacturing device because there is no danger of fume explosion.

Furthermore, it is possible to prevent deformation of particles being bigger than their initial state when using only Pd, so thus being capable of preventing increase of growth temperature of the carbon fiber and increase of the threshold of electron emission.

And, the present invention enables to obtain stable and excellent electron emitting characteristics for a long time.

What is claimed is:

1. A secondary battery including an electronic device, the electronic device comprising:
    a member including at least a plurality of carbon fibers,
    wherein the member, according to Raman spectrum characteristic detected by irradiating laser having a wavelength of 514.5 nm, has a first peak of intensity of Raman scattering in which Raman shift is in a range of 1355±10 kaiser (cm$^{-1}$) and a second peak of intensity of Raman scattering in which Raman shift is in a range of 1580±10 kaiser, and
    wherein Full-Width Half-Maximum (FWHM2) of the first peak and a Full-Width Half-Maximum (FWHM1) of the second peak satisfy a relation that FWHM2/FWHM1≦1.2.

2. A secondary battery including an electronic device, the electronic device comprising:
    a member including at least a plurality of carbon fibers,
    wherein the member, according to Raman spectrum characteristic detected by irradiating laser having a wavelength of 514.5 nm, has a first peak of intensity of Raman scattering in which Raman shift is in a range of 1355±10 kaiser (cm$^{-1}$) and a second peak of intensity of Raman scattering in which Raman shift is in a range of 1580±10 kaiser, and wherein a relative intensity h2, which is difference between background intensity and intensity of the Raman scattering at the first peak, and a relative intensity h1, which is difference between background intensity and intensity of the Raman scattering at the second peak, satisfy a relation that $1.3 \leq h2/h1$.

3. A hydrogen storing device including an electronic device, the electronic device comprising:

a member including at least a plurality of carbon fibers, wherein the member, according to Raman spectrum characteristic detected by irradiating laser having a wavelength of 514.5 nm, has a first peak of intensity of Raman scattering in which Raman shift is in a range of 1355±10 kaiser (cm$^{-1}$) and a second peak of intensity of Raman scattering in which Raman shift is in a range of 1580±10 kaiser, and wherein Full-Width Half-Maximum (FWHM2) of the first peak and a Full-Width Half-Maximum (FWHM1) of the second peak satisfy a relation that $FWHM2/FWHM1 \leq 1.2$.

4. A hydrogen storing device including an electronic device, the electronic device comprising:

a member including at least a plurality of carbon fibers, wherein the member, according to Raman spectrum characteristic detected by irradiating laser having a wavelength of 514.5 nm, has a first peak of intensity of Raman scattering in which Raman shift is in a range of 1355±10 kaiser (cm$^{-1}$) and a second peak of intensity of Raman scattering in which Raman shift is in a range of 1580±10 kaiser, and wherein a relative intensity h2, which is difference between background intensity and intensity of the Raman scattering at the first peak, and a relative intensity h1, which is difference between background intensity and intensity of the Raman scattering at the second peak, satisfy a relation that $1.3 \leq h2/h1$.

5. An electron emitting device comprising:

a member containing at least a plurality of carbon fibers, wherein the member, according to Raman spectrum characteristic detected by irradiating laser having a wavelength of 514.5 nm, has a first peak of intensity of Raman scattering in which Raman shift is in a range of 1355±10 kaiser (cm$^{-1}$) and a second peak of intensity of Raman scattering in which Raman shift is in a range of 1580±10 kaiser, and wherein Full-Width Half-Maximum (FWHM2) of the first peak and a Full-Width Half-Maximum (FWHM1) of the second peak satisfy a relation that $FWHM2/FWHM1 \leq 1.2$.

6. The electron emitting device according to claim 5, wherein a relative intensity h3, which is difference between background intensity and minimum intensity of Raman scattering intensity between the first peak and the second peak, is 1/10 or lower of the relative intensity h2, which is difference between background intensity and intensity of Raman scattering at the first peak.

7. The electron emitting device according to claim 6, wherein the relative intensity h3 is 1/15 or lower of the relative intensity h2.

8. The electron emitting device according to claim 5, wherein each carbon fiber includes graphenes laminated in an axial direction thereof.

9. The electron emitting device according to claim 5, wherein the plurality of carbon fibers have a density of $10^3/cm^2$ or more.

10. The electron emitting device according to claim 5, wherein a number of electron emission sites of the member is $10^3/cm$ or more when electric field intensity $1 \times 10^5 V/cm$ or more is applied to the member.

11. The electron emitting device according to claim 5, further comprising a gate electrode and a cathode electrode positioned on a surface of a substrate with a space therebetween, wherein the carbon fibers are electrically connected to the cathode electrode.

12. The electron emitting device according to claim 11, wherein at least a part of a surface of the plurality of carbon fibers is positioned on the surface of the substrate to be spaced apart more than a distance between a surface of the gate electrode and the surface of the substrate.

13. An electron source having a plurality of electron emitting devices, wherein each electron emitting device is an electron emitting device as set forth in claim 5.

14. An image display device including an electron source and a member, which emits light when electrons emitted from the electron source are irradiated thereto, wherein the electron source is an electron source as set forth in claim 13.

15. An electron emitting device comprising:

a member including at least a plurality of carbon fibers, wherein the member, according to Raman spectrum characteristic detected by irradiating laser having a wavelength of 514.5 nm, has a first peak of intensity of Raman scattering in which Raman shift is in a range of 1355±10 kaiser (cm$^{-1}$) and a second peak of intensity of Raman scattering in which Raman shift is in a range of 1580±10 kaiser, and wherein a relative intensity h2, which is difference between background intensity and intensity of the Raman scattering at the first peak, and a relative intensity h1, which is difference between background intensity and intensity of the Raman scattering at the second peak, satisfy a relation that $1.3 \leq h2/h1$.

16. An electron emitting device according to claim 15, wherein a Full-Width Half-Maximum (FWHM2) of the first peak and a Full-Width Half-Maximum (FWHM1) of the second peak satisfy a relation that $FWHM2/FWHM1 \leq 1.2$.

17. The electron emitting device according to claim 16, wherein the relative intensity h2 and the relative intensity h1 have a relation that $h2/h1 \leq 2.5$.

18. The electron emitting device according to claim 15, wherein a relative intensity h3, which is difference between background intensity and minimum intensity of Raman scattering intensity between the first peak and the second peak, is 1/10 or lower of the relative intensity h2, which is difference between background intensity and intensity of Raman scattering at the first peak.

19. The electron emitting device according to claim 18, wherein the relative intensity h3 is 1/15 or lower of the relative intensity h2.

20. The electron emitting device according to claim 15, wherein each carbon fiber includes graphenes laminated in an axial direction thereof.

21. The electron emitting device according to claim 15, wherein the plurality of carbon fibers have a density of $10^3/cm^2$ or more.

22. The electron emitting device according to claim 15, wherein a number of electron emission sites of the member is $10^3$/cm or more when electric field intensity $1\times10^5$V/cm or more is applied to the member.

23. The electron emitting device according to claim 15, further comprising a gate electrode and a cathode electrode positioned on a surface of a substrate with a space therebetween, wherein the carbon fibers are electrically connected to the cathode electrode.

24. The electron emitting device according to claim 23, wherein at least a part of a surface of the plurality of carbon fibers is positioned on the surface of the substrate to be spaced apart more than a distance between a surface of the gate electrode and the surface of the substrate.

25. An electron source having a plurality of electron emitting devices, wherein each electron emitting device is an electron emitting device as set forth in claim 15.

26. An image display device including an electron source and a member, which emits light when electrons emitted from the electron source are irradiated thereto, wherein the electron source is an electron source as set forth in claim 25.

27. An electron-emitting device comprising a plurality of carbon fibers, a cathode electrode electrically connected to the plurality of carbon fibers, and a gate electrode arranged so as to leave space with the cathode electrode, disposed on a substrate which is arranged opposite to an anode electrode, wherein the carbon fibers have a plurality of graphenes laminated in the axial direction of the carbon fibers, and wherein the plurality of carbon fibers, according to Raman spectrum characteristic detected by irradiating laser having a wavelength of 514.5 nm, have a first peak of intensity of Raman scattering in which Raman shift is in a range of 1355±10 kaiser (cm$^{-1}$) and a second peak of intensity of Raman scattering in which Raman shift is in a range of 1580±10 kaiser, and wherein Full-Width Half-Maximum (FWHM2) of the first peak and a Full-Width Half-Maximum (FWHM1) of the second peak satisfy a relation that FWHM2/FWHM1≦1.2.

28. The electron-emitting device according to claim 27, wherein at least a portion of the carbon fibers and the substrate are spaced apart by more than a distance between the gate electrode and the substrate.

29. The electron-emitting device according to claim 27, wherein the cathode electrode is comprised of metal nitride.

30. The electron-emitting device according to claim 29, wherein the metal nitride is TiN.

31. An electron source having a plurality of electron-emitting devices, wherein each electron emitting device is an electron-emitting device as set forth in claim 27.

32. An image display device including an electron source and a member, which emits light when electrons emitted from the electron source are irradiated thereto, wherein the electron source is an electron source as set forth in claim 31.

* * * * *